United States Patent [19]
Takada et al.

[11] Patent Number: 5,799,486
[45] Date of Patent: Sep. 1, 1998

[54] AXLE DRIVING APPARATUS

[75] Inventors: Kenichi Takada; Ryota Ohashi; Hironori Sumomozawa; Hiroaki Shimizu, all of Amagasaki, Japan

[73] Assignee: Kanzaki Kokyukoki Mfg. Co., Ltd., Japan

[21] Appl. No.: 781,513

[22] Filed: Jan. 9, 1997

[30] Foreign Application Priority Data

Jan. 9, 1996 [JP] Japan .................................. 8-001391

[51] Int. Cl.⁶ .......................... F16H 57/02; F16H 39/16; F16D 39/00
[52] U.S. Cl. .................... 60/464; 60/487; 91/441
[58] Field of Search ..................... 60/487, 464; 91/441

[56] References Cited

U.S. PATENT DOCUMENTS

| | | | |
|---|---|---|---|
| 4,903,545 | 2/1990 | Louis et al. | 60/487 |
| 4,914,907 | 4/1990 | Okada | 60/487 |
| 5,094,077 | 3/1992 | Okada | 60/489 |
| 5,163,293 | 11/1992 | Azuma et al. | 60/487 |
| 5,201,692 | 4/1993 | Johnson et al. | 475/74 |
| 5,339,631 | 8/1994 | Ohashi | 60/487 |
| 5,622,051 | 4/1997 | Iida et al. | 60/487 |

*Primary Examiner*—Sheldon Richter
*Attorney, Agent, or Firm*—Sterne Kessler Goldstein & Fox P.L.L.C.

[57] ABSTRACT

An axle driving apparatus in which a hydraulic pump and a hydraulic motor which constitute a hydrostatic transmission are disposed on a center section. In a horizontal portion of the center section are provided a pair of linear oil passages in parallel to each other. A pair of arcuate ports are provided on a pump mounting surface formed on the horizontal portion of the center section. The pair of arcuate ports are substantially perpendicular with respect to the direction in which the oil passages extend. The axis of slanting movement of a movable swash plate of the hydraulic pump extends laterally of the vehicle body on which the axle driving apparatus is provided. The rotating direction of an arm provided on a control shaft for slantingly operating the movable swash plate is coincident with the operating direction of a control rod connected with a speed changing member. Thus, the link mechanism for connecting the speed changing member and the control arm for the movable swash plate is simplified.

8 Claims, 26 Drawing Sheets

AXLE DRIVING APPARATUS

FIELD OF THE INVENTION

The present invention relates to an axle driving apparatus which is housed in a common housing with a hydrostatic transmission (hereinafter referred to as an "HST").

BACKGROUND OF THE INVENTION

Related Art

U.S. Pat. Nos. 4,903,545 and 4,914,907, for example, disclose an axle driving apparatus which includes an HST, a differential gear unit and axles interlocked with each other housed in a common housing. The HST comprises a hydraulic pump disposed on a horizontal portion of a center section which is L-like-shaped and has a horizontal portion and a vertical portion. A hydraulic motor is disposed on the vertical portion of the center section. The hydraulic pump and hydraulic motor are fluidly connected by a closed fluid circuit provided in the center section. The hydraulic pump is driven by an external prime mover so as to drive the hydraulic motor to thereby drive the axles. U.S. Pat. No. 5,201,692, for example, discloses providing a check valve at the negative pressure side of the closed fluid circuit of the center section and at the lower portion of the center section through which oil stored in the housing is automatically sucked into the closed fluid circuit.

U.S. Pat. No. 4,903,545 discloses that in order for a pair of oil passages constituting the closed fluid circuit to communicate simply with a pair of arcuate ports formed on a pump mounting surface on the upper surface of the horizontal portion of the center section, each arcuate port is disposed in parallel to the extending direction of the oil passage overlapping a substantially longitudinal center portion of each arcuate port with each oil passage to communicate therewith. The substantially longitudinal center portion of each port, which is overlapped by each port, is formed to directly downwardly communicate with each oil passage.

When the arcuate ports are formed as mentioned above, a movable swash plate of the hydraulic pump is not able to slantingly rotate around its axis at a right angle to the axles. Hence, a control shaft for controlling the slanting rotation direction of the movable swash plate, when disposed at a right angle to the axis of rotation of the hydraulic pump, must be disposed perpendicular to the axles. However, a control rod connected to a speed changing member provided on the vehicle for changing the vehicle speed extends towards the axle driving apparatus and may be pushed or pulled longitudinally of the vehicle body, whereby the control rod cannot be directly connected to the control shaft for the movable swash plate. Hence, a link mechanism is required to convert the longitudinal direction of operation to a lateral direction of operation.

In U.S. Pat. No. 5,094,077, the control shaft for the movable swash plate is disposed in parallel to the axis of rotation of the hydraulic pump so that such a link mechanism is not required. However, in order to convert the horizontal movement of the swinging arm provided at the operating shaft into a lateral movement of the movable swash plate, the utmost end of the control arm is made spherical. A pair of shaft guide members, each having a hemispherical recess, are provided for receiving each spherical end of the control arm so that the control arm must be connected to the movable swash plate through the shaft guide member, resulting in that the number of necessary parts is increased as is the manufacturing cost.

In the above-mentioned U.S. Pat. No. 4,914,907, the arcuate ports at the pump side of the center section are disposed perpendicularly to the extending direction of the oil passages respectively. As such, the operating shaft of the movable swash plate can be disposed at a right angle with respect to the axis of rotation of the hydraulic pump and in parallel to the axles so that the aforesaid link mechanism is unnecessary. However, since the arcuate ports and oil passages communicate with each other through separate oil passages formed perpendicularly with respect to said passages, the construction of the passages is more complicated than is preferable.

Also, in U.S. Pat. No. 5,201,692, at the lower surface of the center section are open two oil holes communicating with the closed fluid circuit. A ball is inserted into each oil hole. A plate is mounted to the lower surface of the center section by a plurality of bolts. The plate is provided with openings which enable oil in the housing to flow into the closed fluid circuit while preventing the balls from escaping from the holes. This check valve arrangement requires a large number of parts, more man-power to construct and is high in manufacturing cost.

SUMMARY OF THE INVENTION

An object of the present invention is to provide an improvement in a center section on which a hydraulic pump is mounted so that a movable swash plate of the hydraulic pump housed in a housing can be efficiently operated. In particular, the HST comprises a hydraulic pump and a hydraulic motor, which are individually mounted on mounting surfaces of the center section. The center section has a horizontal portion and a vertical portion and is substantially L-like-shaped. The horizontal portion of the center section is provided with a pair of linear oil passages which extend in parallel to each other. One end of each oil passage communicates with one of a pair of arcuate ports provided on the motor mounting surface formed on the vertical portion of the center section. An intermediate portion of each of the oil passages communicates with one of a pair of arcuate ports disposed on the pump mounting surface formed on the horizontal portion of the center section. Whereby, two pair of arcuate ports are connected with each other forming a closed fluid circuit.

The arcuate ports on the pump mounting surface are disposed substantially vertically with respect to the direction in which the oil passages extend and overlap at both ends with the respective oil passages. One of the arcuate ports is deeper at one end so as to communicate with one of the oil passages. The other arcuate port is deeper so as to communicate with the other oil passage, whereby the construction of the oil passages and arcuate ports is simple for communicating with each other so as to reduce manufacturing cost.

Since the arcuate ports are open at the pump mounting surface and extend in parallel to the direction of downward movement the vehicle body, the axis of slanting movement of the movable swash plate for changing the discharge direction and a discharge amount of oil from the hydraulic pump extends laterally of the vehicle body. A control shaft for slantingly operating the movable swash plate can be disposed at a right angle to the axis of rotation of the hydraulic pump and parallel to the axles. The rotating direction of an arm provided at the control shaft and the operating direction of a control rod connected to a speed changing member are coincident with each other. Whereby the control rod can be directly connected at one end thereof with a control arm for the movable swash plate so as to simplify the link mechanism.

In the case where the movable swash plate is of a cradle type such that the upper surface thereof is made convex to be slidable along a concave portion formed on the inner surface of the housing, the axis of the control shaft rotatably supported by the side wall of the housing is made coincident with the center of curvature of the convex portion of the movable swash plate. An engaging portion of the swinging arm provided on the control shaft can be directly connected with respect to a groove in the side surface of the movable swash plate. Thereby enabling the above-mentioned shaft guide member to be omitted, so as to reduce the number of parts required. Also, the relative sliding movement of the groove in the movable swash plate to the engaging portion of the swinging arm is scarcely formed. Whereby the movable swash plate can be operated smoothly without the need to apply excessive force.

Vertical oil holes are branched from a pair of oil passages for fluidly coupling the hydraulic pump with the hydraulic motor and then are open toward the lower surface of the center section. Check valves for supplying operating oil are disposed in each oil hole and comprise cylindrical and bottomed valve casings inserted into each oil holes and a ball contained in each valve casing. The opening formed at the lower surface of each valve casing is closed by a ball in a manner of being freely open or closed. The lower surface of each valve casing is supported to abut against the upper end surface of a projection formed on the inner bottom surface of the housing. Whereby, the check valve can be simply locked.

BRIEF DESCRIPTION OF THE FIGURES

The above and further objects and features of the invention will be more fully apparent from the following detailed description when the same is read in connection with the accompanying drawings in which.

DETAILED DESCRIPTION OF THE PREFERRED EMBODIMENTS

Figure 1:
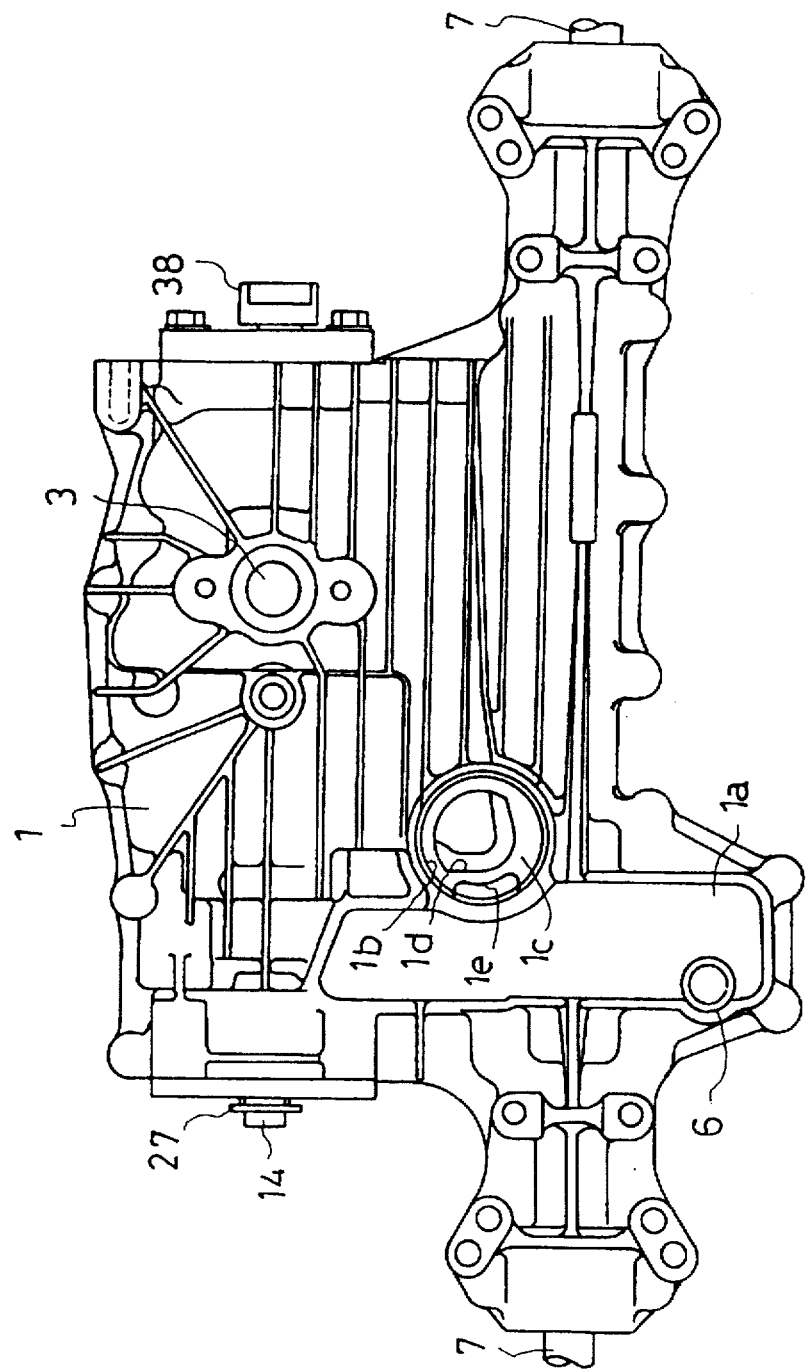
FIG. 1 is a plan view of an axle driving apparatus of the present invention.
Figure 6:
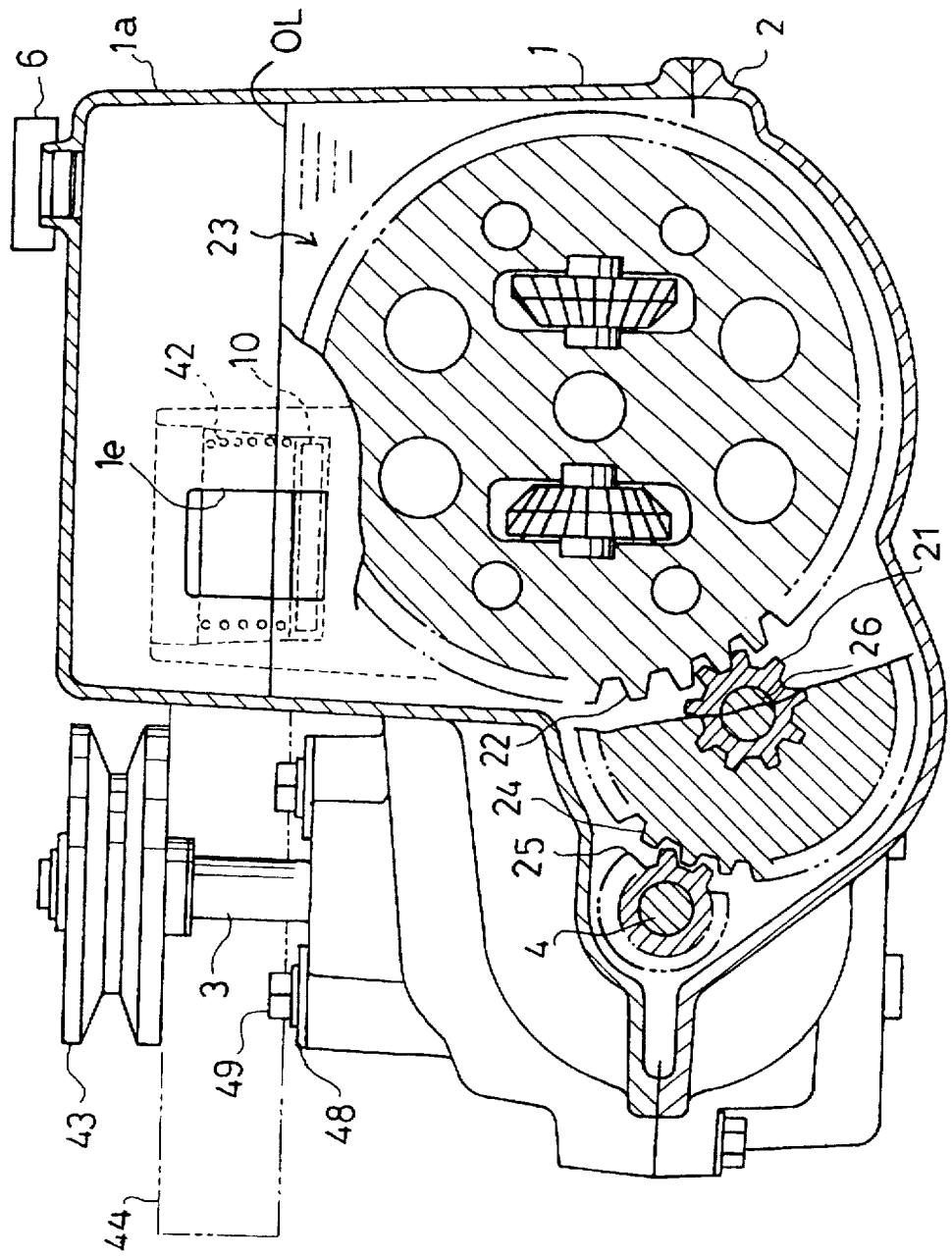
FIG. 6 is a cross-sectional view looking in the direction of the arrows 6—6 in FIG. 2.

Explanation will first be given on the entire construction of an axle driving apparatus in accordance with FIGS. 1, 2 and 3, in which a housing thereof is constructed by joining an upper half housing 1 and a lower half housing 2 along horizontal and flat surrounding joint surfaces. At the joint surfaces is provided a bearing for a motor shaft 4. Bearings for axles 7 are shifted upwardly from the joint surfaces of the housing and are disposed in the upper half housing 1 to rotatably support axles 7. A counter shaft 26 is mounted laterally between motor shaft 4 and axles 7, and as shown in FIG. 6, is shifted downwardly from the joint surfaces. Thus, axles 7 are disposed in the upper half housing 1 above the joint surface, counter shaft 26 is disposed in lower half housing 2 under the joint surface thereof; and motor shaft 4 is disposed level with the joint surface. Axles 7 are differentially coupled by a differential gear unit 23. One end of each axle 7 projects laterally from the housing. While these shafts and axles are interlocked with each other through a gear train for power transmission discussed below, the horizontal distance between the shafts is reduced, and the longitudinal dimension of the housing of the axle driving apparatus is diminished so as to be compact.

Figure 7:
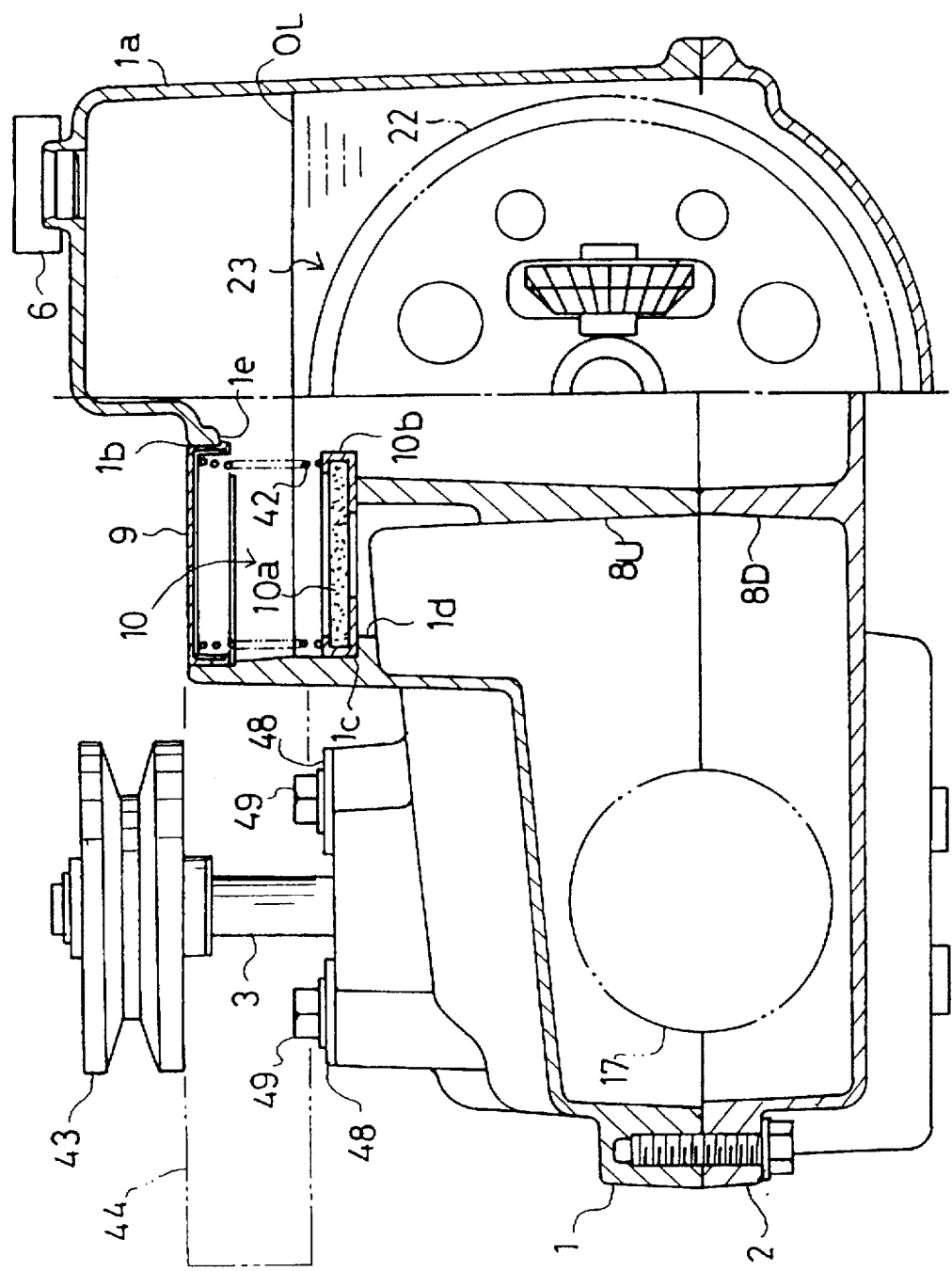
FIG. 7 is a cross-sectional view looking in the direction of the arrows 7—7 in FIG. 2.
Figure 8:
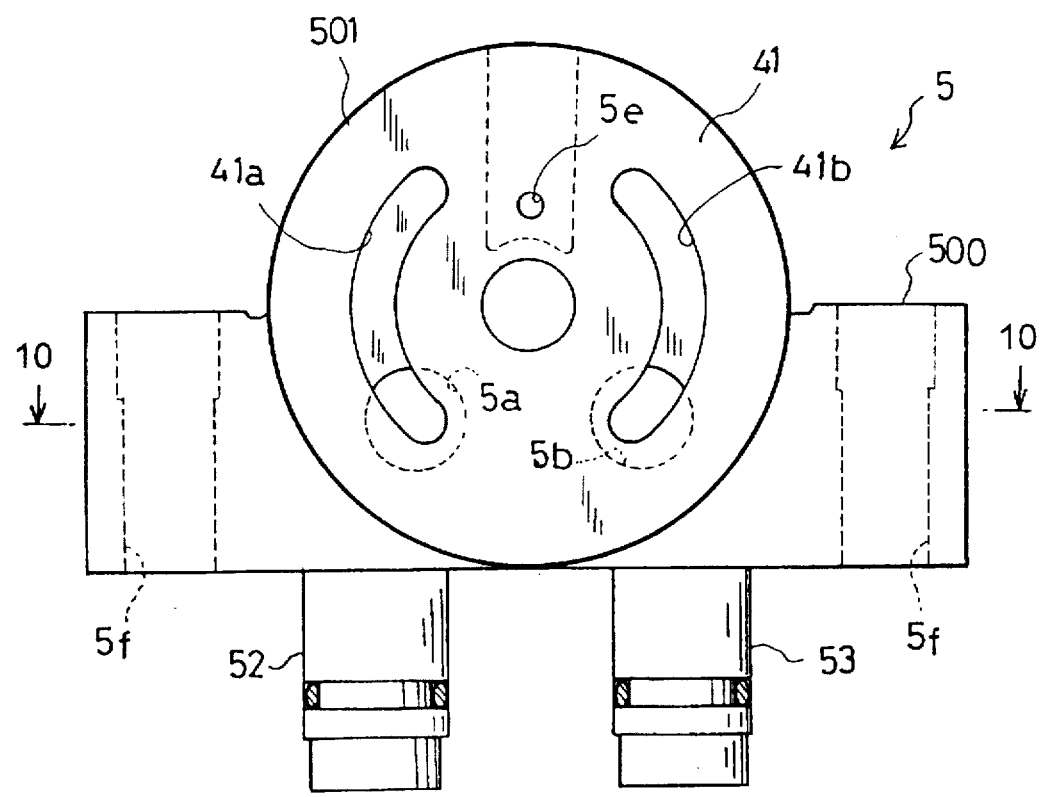
FIG. 8 is a side view of a center section of the present invention.

The interior of the housing is divided by an inner wall 8 into a first chamber R1 for housing the HST and a second chamber R2 for housing a transmission gear unit for transmitting power from motor shaft 4 to differential gear unit 23 and axles 7. Inner wall 8, as shown in FIG. 7, comprises an inner wall portion 8U which projects downwardly from the upper inner surface of housing 1 and an inner wall portion 8D which projects upwardly from the bottom inner surface. The end surfaces of inner wall portions 8U and 8D are brought into contact with each other to form inner wall 8. First and second chambers R1 and R2 are filled with lubricating oil in common so as to form an oil sump. An air reservoir, as shown in FIGS. 7 and 8, is formed above differential gear unit 23 in upper half housing 1. On the upper surface of the housing positioned above the air reservoir is provided an oiling lid 6 having a breather mechanism.

A cylindrical portion 1b which is open at the upper end thereof is integrally provided adjacent to a swollen portion formed on the upper wall of upper half housing 1 which houses therein differential gear unit 23. A filter loading portion 1c is constructed on the bottom surface of cylindrical portion 1b. At the lower wall and the side wall of the filter loading portion 1c are open communicating bores 1d and 1e which communicate with each other within cylindrical portion 1b. An oil filter 10 is mounted on oil filter loading portion 1c. Oil filter 10 comprises a filter body 10a and a sealing material 10b, such as rubber, for covering the outer peripheral surface of filter body 10a, and partitions between bores 1d and 1e. The open end of cylindrical portion 1b is closed by a lid 9. A spring 42 is interposed between oil filter 10 and lid 9 so as to bias oil filter 10 toward filter loading portion 1c.

The amount of lubricating or operating oil filling the housing is set to sufficiently immerse the HST and the respective bearings in the oil. The oil level 0L is somewhat higher than oil filter 10 so that the oil is flowable through communicating hole 1d, oil filter 10 and communicating hole 1e. Accordingly, oil filling the housing is usable in common as operating oil for the HST and lubricating oil for the gears and bearings. When the HST operates to raise the temperature of the oil and to increase the volume of the oil in first chamber R1, the oil is allowed to escape into second chamber R2. Conversely, when the HST stops, the oil temperature and the volume of oil in first chamber R1 decreases, causing oil to enter first chamber R1 from second chamber R2. At which time, any foreign object such as iron powder which can be harmful to the HST, is filtered by oil filter 10 so as to be prevented from entering into first chamber R1. This always keeps the oil in first chamber R1 clean.

Figure 9:
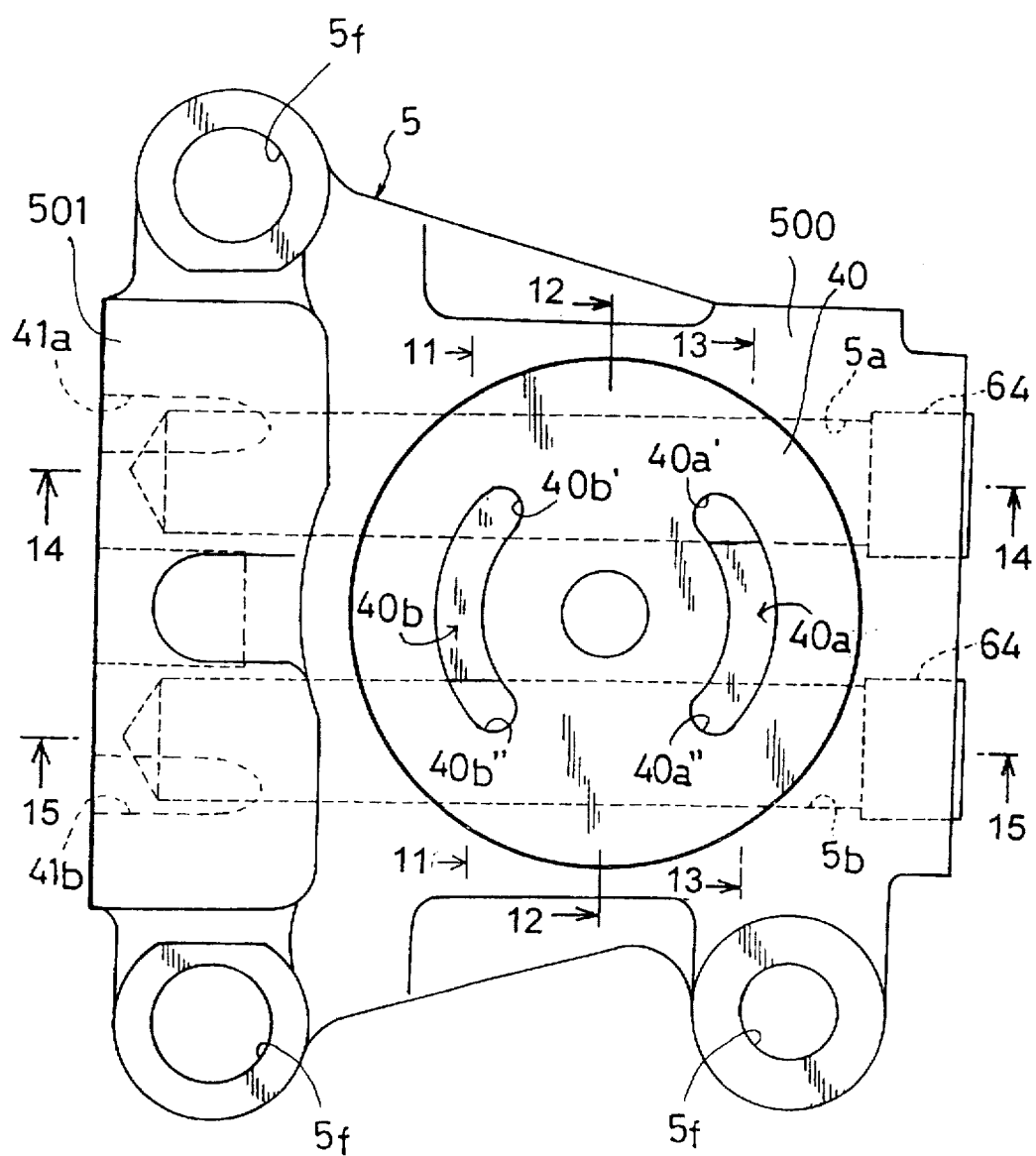
FIG. 9 is a plan view of the same.
Figure 10:
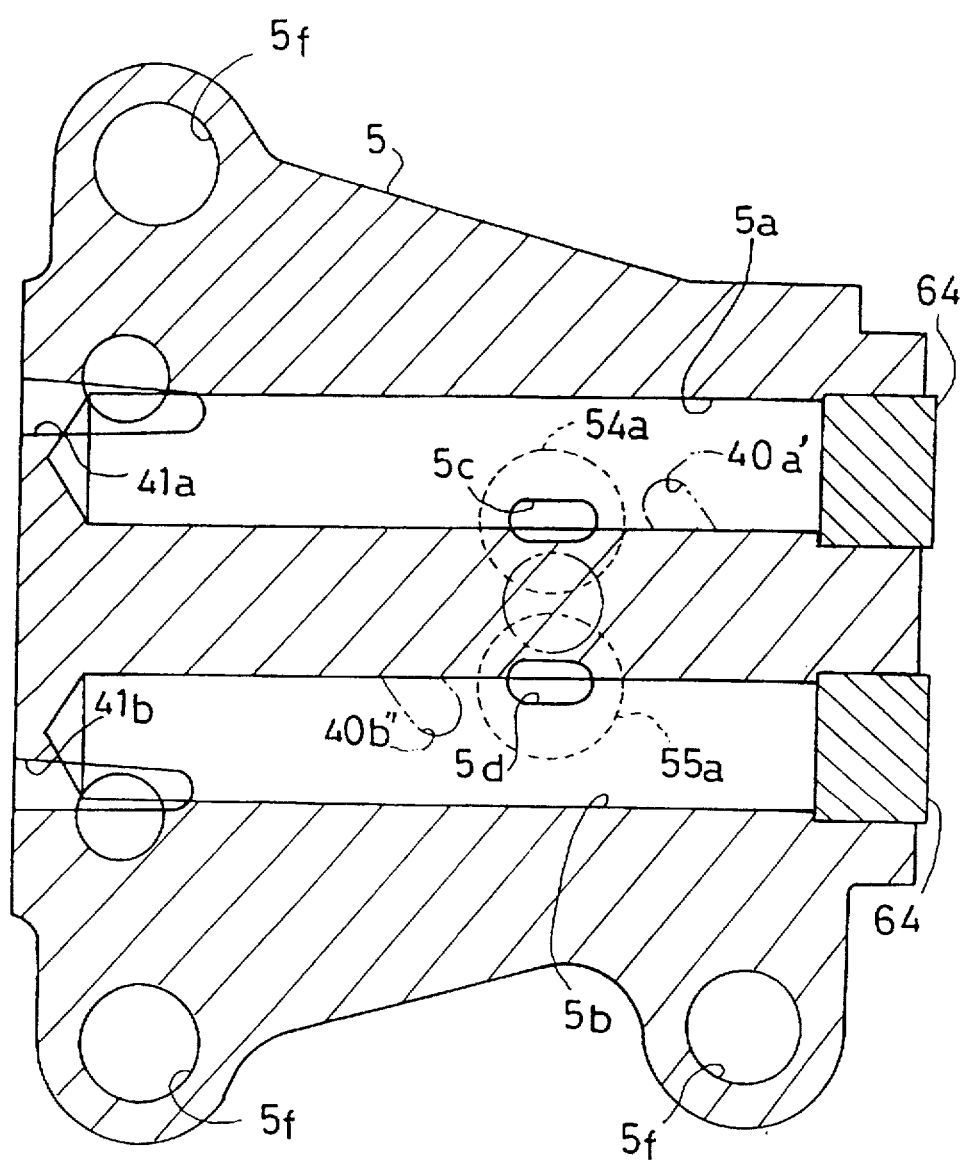
FIG. 10 is a cross-sectional view looking in the direction of the arrows 10—10 in FIG. 8.
Figure 12:
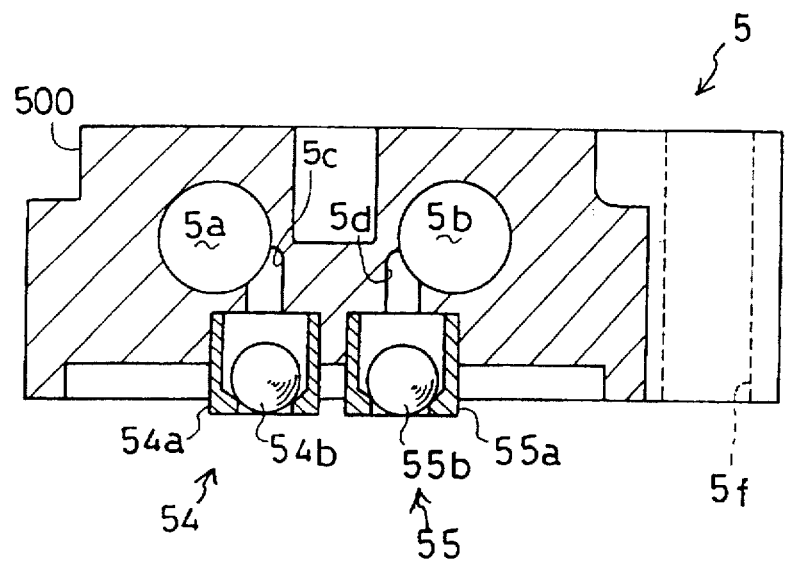
FIG. 12 is a cross-sectional view looking in the direction of the arrows 12—12 in FIG. 9.

Within first chamber R1 is mounted a center section 5 which is L-like shaped when viewed from the side and has a horizontal portion 500 and a vertical portion 501. At the peripheral portions of horizontal portion 500 are vertically open through bores 5f at three positions as shown in FIG. 9. A mounting bolt 30 is inserted into each through bore 5f from below to fix center section 5 to the inside of upper half housing 1. On the upper surface of horizontal portion 500 of center section 5 is formed a pump mounting surface 40. A cylinder block 16 is rotatably slidably disposed thereon. Pistons 12 are fitted, through biasing springs, into a plurality of cylinder bores in cylinder block 16 and are reciprocally movable. A thrust bearing 11a of a movable swash plate 11 abuts against the heads of pistons 12. An opening 11b is provided at the center of movable swash plate 11 so as to enable input shaft 3 to perforate therethrough. Input shaft 3 is vertically disposed and is not relatively rotatably retained onto the axis of rotation of cylinder block 16, thereby constituting an axial piston type hydraulic pump. Input shaft 3 projects outwardly at the upper end thereof from upper half housing 1. An input pulley 43 with a cooling fan 44 is fixed on input shaft 3. Input pulley 43 receives power from a prime mover (not shown) through a belt transmitting mechanism (also not shown).

Figure 3:
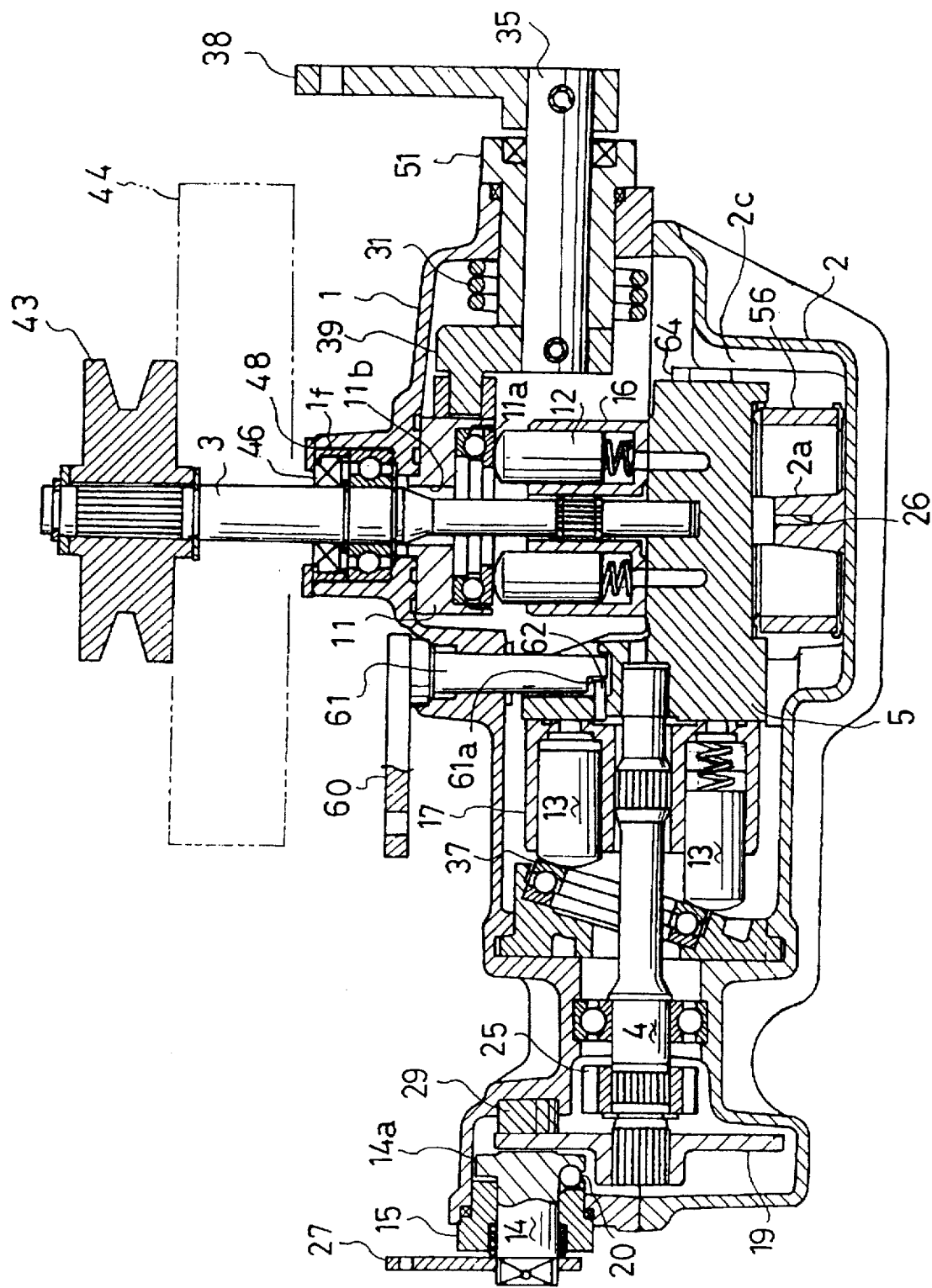
FIG. 3 is a cross-sectional view looking in the direction of the arrows 3—3 in FIG. 2.

As shown in FIG. 3, at the outside surface of vertical portion 501 of center section 5 is formed a motor mounting surface 41 on which a cylinder block 17 is rotatably supported. A plurality of pistons 13 are fitted into a plurality of cylinder bores in cylinder block 17. Pistons 13 are reciprocally movable whereby the heads thereof abut against a fixed swash plate 37 which is fixedly sandwiched between upper half housing 1 and lower half housing 2. An output shaft 4 is horizontally disposed on the axis of rotation of cylinder block 17 and is not relatively rotatably retained thereto so as to constitute an axial piston type hydraulic motor. Output shaft 4 is also rotatably supported by a bearing bore provided on the vertical portion 501 of center section 5 and by a bearing held at the joint surfaces of upper half housing 1 and lower half housing 2.

Figure 2:
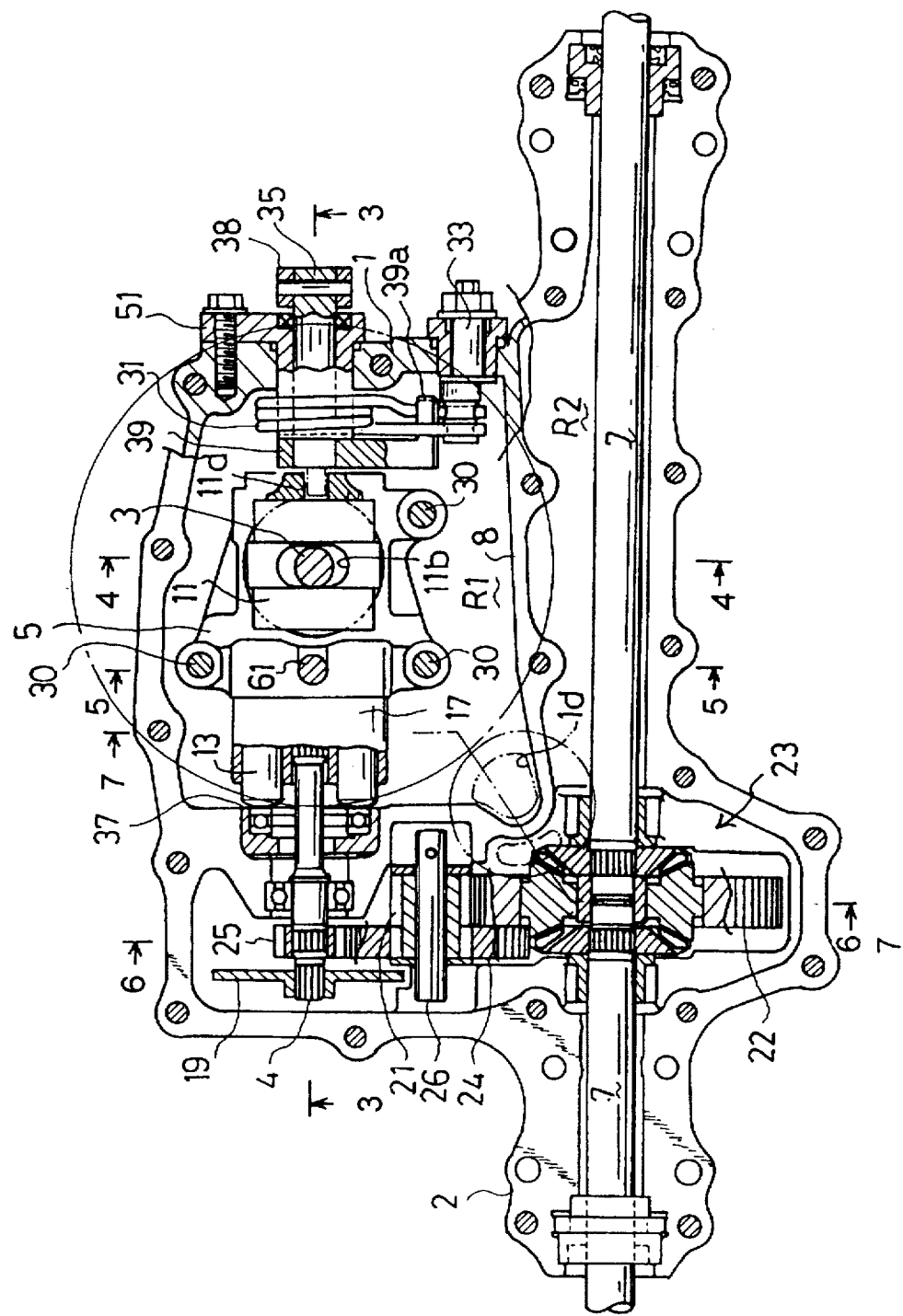
FIG. 2 is a partial cross-sectional view of the same, from which an upper half housing has been removed.

A drive train for transmitting power from output shaft 4 to differential gear unit 23 is shown in FIGS. 2 and 6. A gear 25 engageable with a larger diameter gear 24 on counter shaft 26 is provided on output shaft 4 where it enters into second chamber R2. A smaller diameter gear 21 on counter shaft 26 engages with a ring gear 22 of differential gear unit 23. Smaller diameter gear 21 is cylindrical and extends in the direction of the axis of rotation of the gear. External teeth of gear 21 engage with a central opening of larger diameter gear 24 so as to mutually connect therewith. Ring gear 22 drives differential gear unit 23 so as to transmit power to left and right axles 7.

Figure 16:
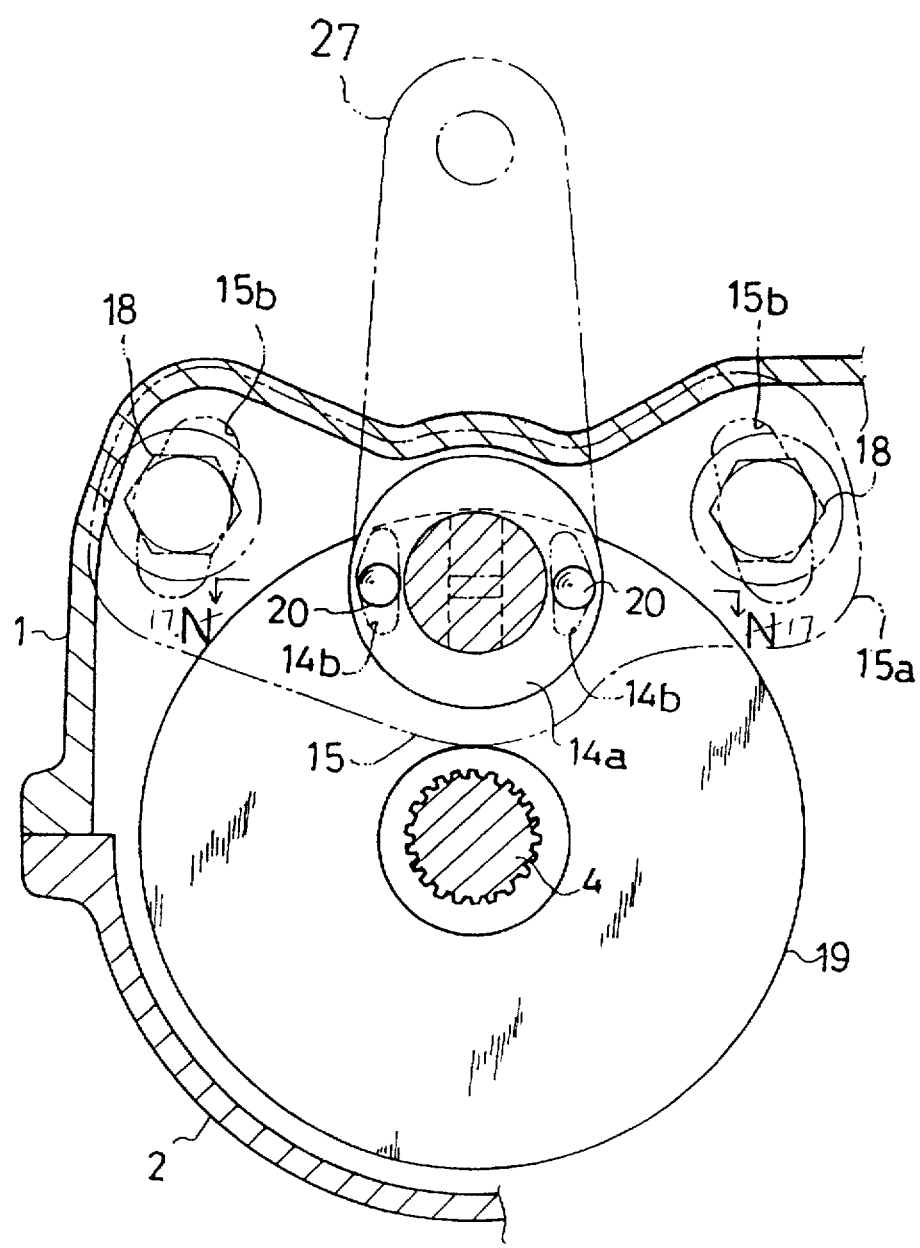
FIG. 16 is a cross-sectional side view of a brake unit according to the present invention.
Figure 17A:
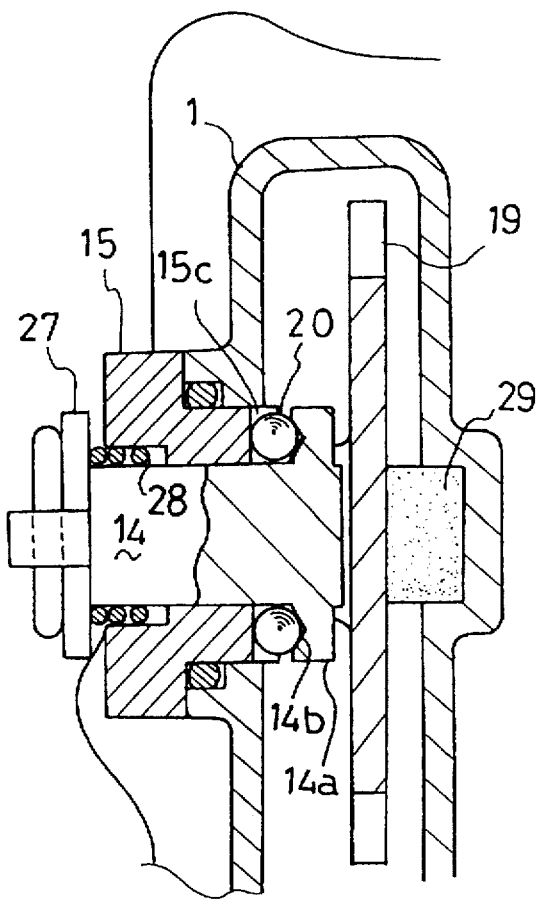
FIG. 17(a) is a cross-sectional view looking in the direction of the arrows 17—17 in FIG. 16.

As shown in FIGS. 3, 16 and 17, a brake disc 19 is fixed onto an axial end of output shaft 4 positioned in second chamber R2. A brake pad 29 is fitted into the inside surface of upper half housing 1 opposite to one side surface of an upper portion of brake disc 19. A brake operating shaft 14 is horizontally disposed at the inside surface of upper half housing 1 opposite to the other side surface of disc 19 and perforates into and out of upper half housing 1 and is axially slidably supported thereto through a cylindrical bush 15. One end surface of brake pad 29 and the inner end surface of brake operating shaft 14 are opposite to each other and sandwich therebetween brake disc 19. Brake operating shaft 14 is supported by the housing in parallel to motor shaft 4. A brake arm 27 is fixed to the outer end of brake operating shaft 14 projecting from the housing. A spring 28 is fitted onto brake operating shaft 14 so as to bias brake operating shaft 14 by moving the inner end surface of shaft 14 away from brake disc 19.

Figure 17B:
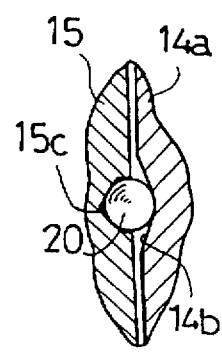
FIG. 17(b) is an enlarged cross-sectional view showing only a part of the principal portion of that shown in FIG. 17(a)
Figure 18:
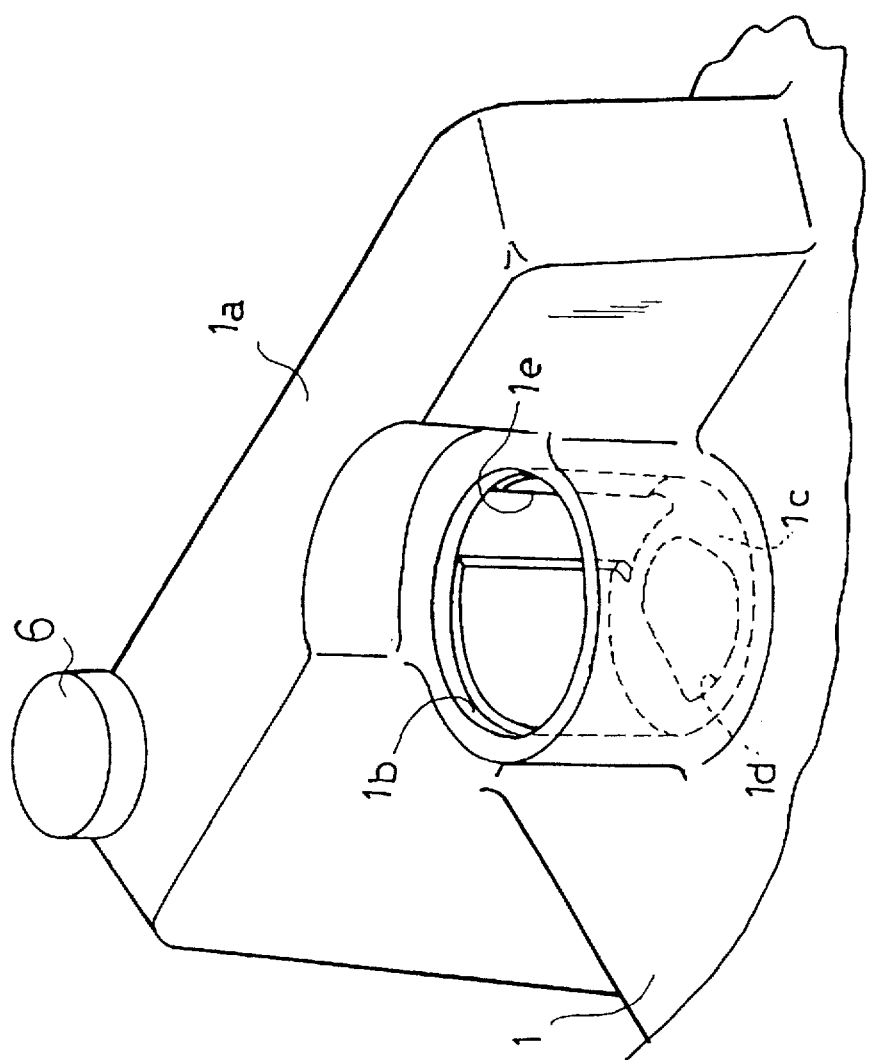
FIG. 18 is a partial perspective view of an upper wall of the upper half housing showing an air reservoir and a cylindrical portion.

On the inner end of brake operating shaft 14 which enters into the housing is formed a flange 14a. On the surface thereof opposite to the inside surface of the housing are provided two cam grooves 14b which are V-like shaped when viewed in cross section and are crescent shaped when viewed in elevation. Recesses 15c are formed in the end surface of cylindrical bush 15 so as to be opposite to cam groove 14b. A ball 20 is interposed between each recesses 15c and each cam groove 14b, as shown in FIG. 17(b). Because of this construction, when brake arm 27 is rotated around brake shaft 14, each ball 20 held in a recess 15c gradually rides on cam groove 14b from the deepest portion to the thinnest portion. Brake operating shaft 14 slides toward brake disc 19, so that the brake disc 19 is biased between the inner end surface of brake operating shaft 14 and brake pad 29, thereby exerting a braking action to output shaft 4. Also, at the outer end of cylindrical bush 15 is integrally provided a radially extending flange 15a. At flange 15a are open elongate bores 15b each in a circular arc around the axis of brake operating shaft 14. A bolt 18 is inserted into each elongate bore 15b to thereby non-rotatably fix bush 15 to the outside wall of upper half housing 1. Bolts 18 are unscrewed to properly rotate flange 15a around brake shaft 14, thereby enabling the timing of each ball 20 riding along cam groove 14b to be adjusted.

As shown in FIG. 9, a pair of arcuate ports 40a and 40b are open along pump mounting surface 40 of center section 5 so that the feed oil discharged from cylinder block 16 is introduced into center section 5. As shown in FIG. 8, a pair of arcuate ports 41a and 41b are open on the motor mounting surface 41 thereby introducing feed discharge oil into center section 5 from cylinder block 17.

A first linear oil passage 5a and a second linear oil passage 5b are drilled in parallel with each other, when viewed in plan, within the thick horizontal portion 500 of the center section 5 forming a closed fluid circuit for circulating operating oil between the hydraulic pump and the hydraulic motor. In particular, as shown in FIGS. 8 and 9, arcuate ports 40a and 40b on pump mounting surface 40 are disposed perpendicular to the extending direction of first linear oil passage 5a and second linear oil passage 5b. The length of arcuate ports 40a and 40b and the distance between first and second linear oil passages 5a and 5b are designed so that one end portion 40a' of arcuate port 40a and one end portion 40b' of arcuate port 40b overlap first linear oil passage 5a. The other end portion 40a" of arcuate port 40a and the other end portion 40b" of arcuate port 40b overlap with second linear oil passage 5b.

Figure 11:
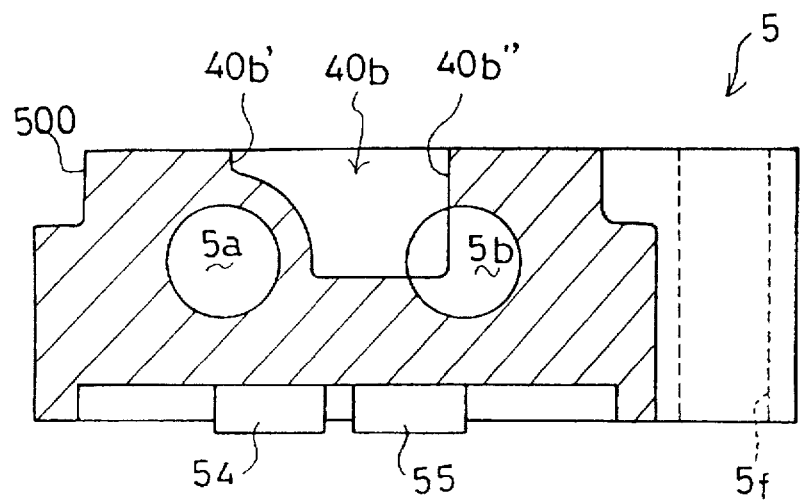
FIG. 11 is a cross-sectional view looking in the direction of the arrows 11—11 in FIG. 9.
Figure 13:
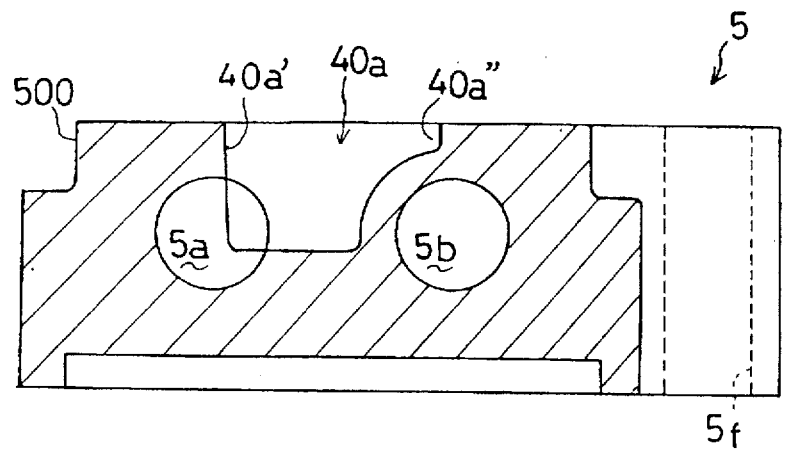
FIG. 13 is a cross-sectional view looking in the direction of the arrows 13—13 in FIG. 9.

As shown in FIG. 13, arcuate port 40a is made deeper at one end portion 40a' to communicate with first linear oil passage 5a. The other end portion 40a" is thinner so as to not communicate with second linear oil passage 5b. As shown in FIG. 11, one end portion 40b' of arcuate port 40b is made so thin as to not communicate with first linear oil passage 5a. The other end portion 40b" of the same is made deeper to communicate with second linear oil passage 5b.

Figure 14:
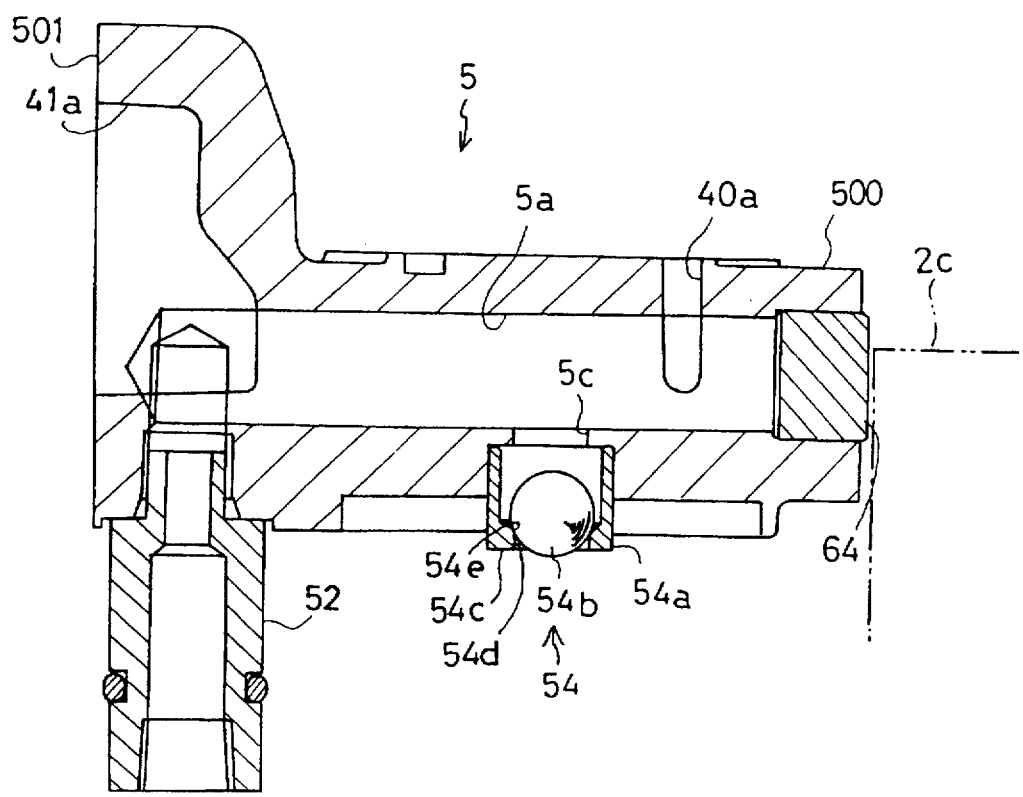
FIG. 14 is a cross-sectional view looking in the direction of the arrows 14—14 in FIG. 9.
Figure 15:
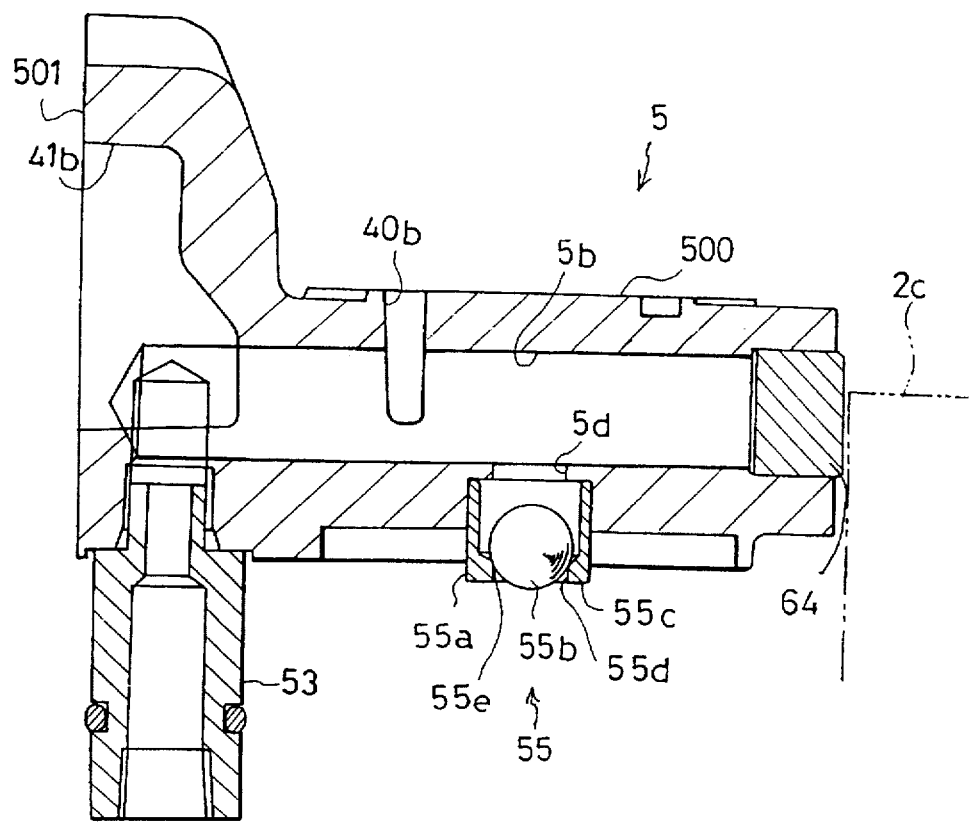
FIG. 15 is a cross-sectional view looking in the direction of the arrows 15—15 in FIG. 9.

As shown in FIGS. 9 and 14, first linear oil passage 5a communicates at the terminal portion thereof with arcuate port 41a on motor mounting surface 41 and at the intermediate portion with one end 40a' of arcuate port 40a on pump mounting surface 40. The beginning of first linear oil passage 5a is closed by a plug member 64. As shown in FIGS. 9 and 15, second linear oil passage 5b communicates at the terminal portion thereof with arcuate port 41b on motor mounting surface 41 and at the intermediate portion with the other end 40b" of arcuate port 40b on pump mounting surface 40. The beginning of second linear oil passage 5b is closed by a plug member 64. The outer end surface of each plug member 64, when the center section 5 is placed in position in the housing, is opposite to the end surfaces of projections 2C provided on the inner wall of lower half housing 2. Even when plug members 64 are subjected to pressure in first and second linear oil passages 5a and 5b, they are prevented from escaping from center section 5. Thus, the variable displacement hydraulic pump and fixed displacement hydraulic motor are connected under oil pressure through the closed fluid circuit. In addition, when the depths of arcuate ports 40a and 40b with respect to the first and second linear oil passages 5a and 5b are made reverse, in other words, the one end portion 40a' of the arcuate port 40a is made smaller in depth so as not to communicate with the first linear oil passage 5a and the other end portion 40a" of the same is made larger in depth so as to communicate with the second linear oil passage 5b, one end portion 40b' of arcuate port 40b is made deeper in order to communicate with first linear oil passage 5a. The other end portion 40b" of the same is made thinner so as to not communicate with second linear oil passage 5b. So that even when the output rotating direction of the prime mover is reversed with respect to input shaft 3, it is possible that the output rotation direction of the hydraulic motor is not changed.

Figure 5:
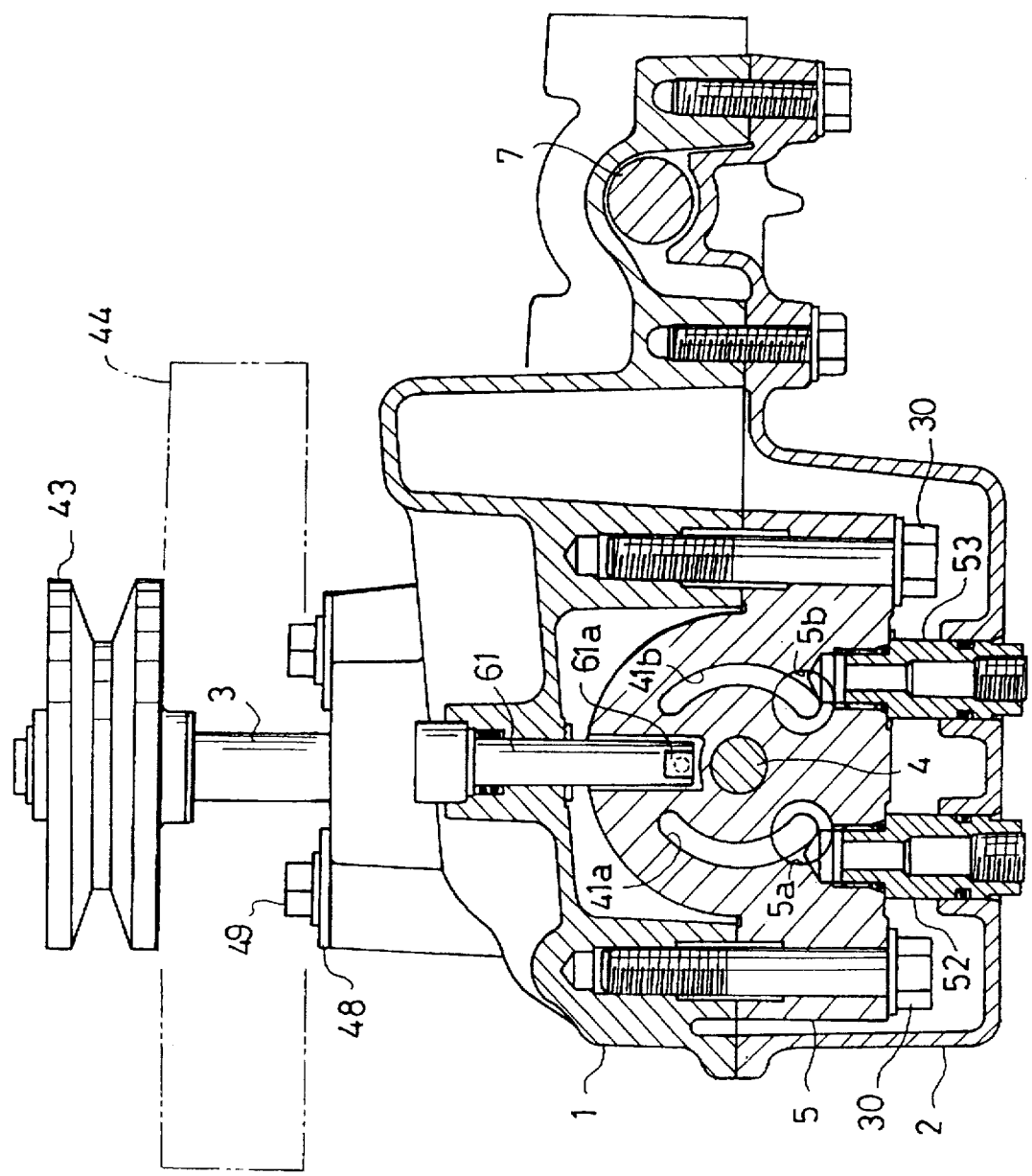
FIG. 5 is a cross-sectional view looking in the direction of the arrows 5—5 in FIG. 2.

As shown in FIGS. 5, 14 and 15, in order to fill the closed fluid circuit with operating oil after the axle driving apparatus has been assembled, oiling pipes 52 and 53 communicating with first and second linear oil passages 5a and 5b are disposed on the lower surface of the horizontal surface of center section 5 and are exposed at the lower ends thereof from the outer bottom surface of lower half housing 2. The open end of each oiling pipe 52 and 53 is closed by a blind plug after the closed fluid circuit is filled with operating oil.

As shown in FIGS. 4, 12, 14 and 15, vertical oil holes 5c and 5d are branched downwardly from the intermediate portion and extend in the direction of first and second linear oil passages 5a and 5b. Vertical oil holes 5c and 5d are open on the lower surface of horizontal portion 500 of center section 5. Check valves 54 and 55 for operating supply oil are disposed in the operating end of oil holes 5c and 5d, respectively. Check valves 54 and 55 are simply constructed by housing balls 54b and 55b in valve casings 54a and 55a, respectively. Valve casings 54a and 55a are cylindrically shaped. The bottom thereof is provided at the center of lower surfaces 54c and 55c with openings 54d and 55d and form the upper inner peripheral portion of openings 54d and 55d into valve seats 54e and 55e with which balls 54b and 55b come into close contact, respectively. Thus, casings 54a and 55a housing balls 54b and 55b therein are merely contained in the oil holes 5c and 5d, so that openings 54d and 55d are closed by the weight of balls 54b and 55b and pressure in first and second linear oil passages 5a and 5b respectively, thereby providing check valves which are simple in construction and are inexpensive to produce.

Figure 4:
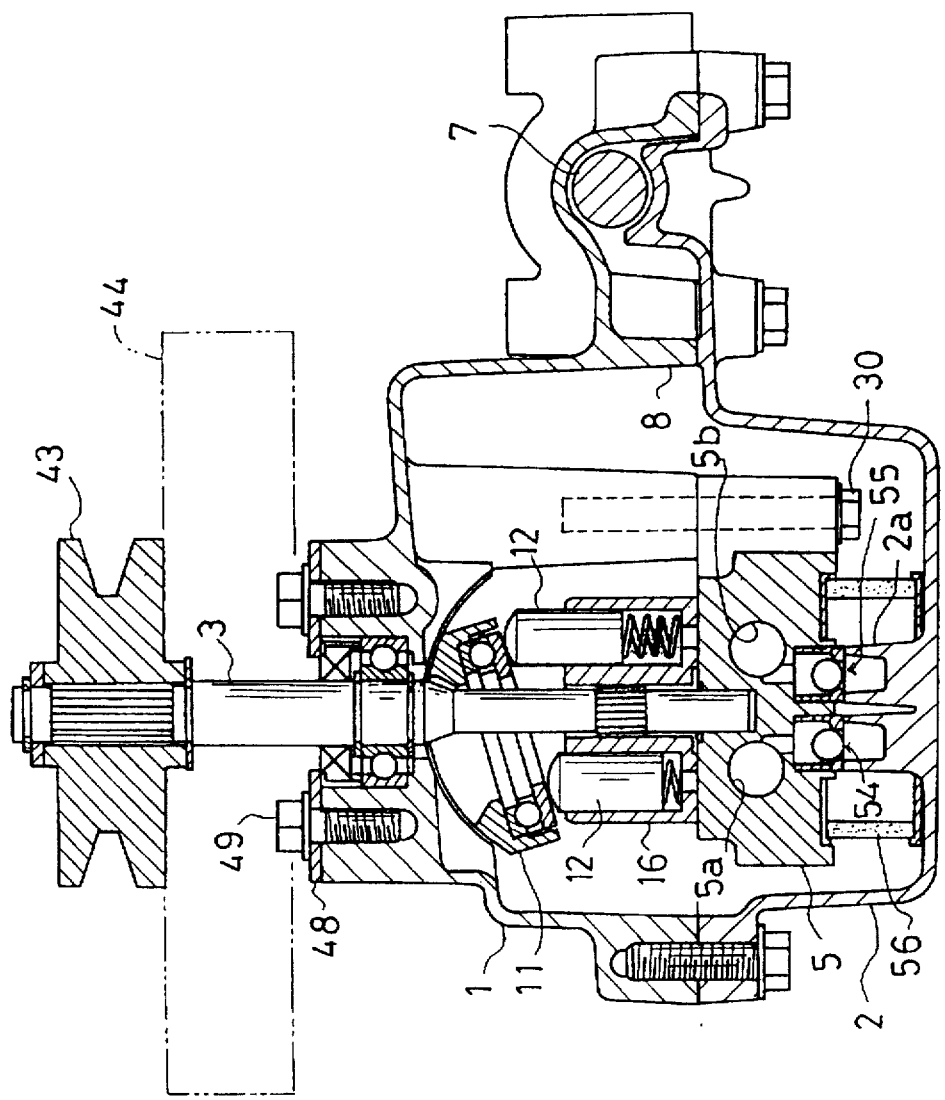
FIG. 4 is a cross-sectional view looking in the direction of the arrows 4—4 in FIG. 2.
Figure 22:
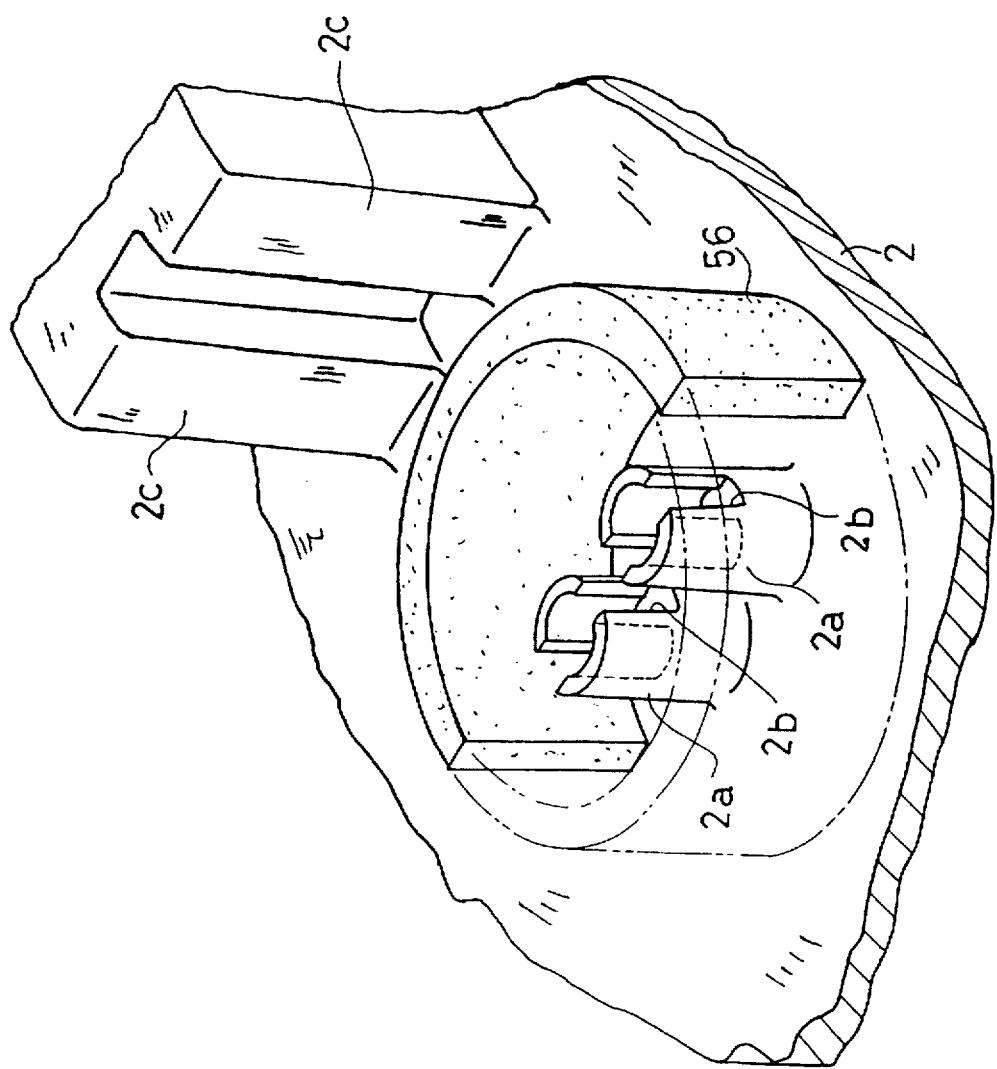
FIG. 22 a partial perspective view of the inner bottom surface of a lower half housing showing projections of a check valve.

Since valve casings 54a and 55a, when inserted into oil holes 5c and 5d, have a potential of being subjected to the pressure of first and second linear oil passages 5a and 5b so as to downwardly escape from oil holes 5c and 5d, as shown in FIGS. 4 and 22, on the inner bottom surface of lower half housing 2 are integrally formed upwardly projecting projections 2a which have sufficient length to abut against lower surfaces 54c and 55c of valve casings 54a and 55a. The projections 2a are formed to meet outer diameters of valve casings 54a and 55a. An annular oil filter 56 is disposed on the inner bottom surface of lower half housing 2 in a manner of surrounding projections 2a. Oil filter 56 is covered on the upper and lower end surfaces thereof with a sealing material. The lower surface of center section 5 is brought into close contact with the inner bottom surface of lower half housing 2, thereby partitioning the interior of oil filter 56 from the exterior thereof, whereby the oil is always kept clean. Oil filter 56 is made of an annular piece of molded porous material, such as cellulose or a foaming agent, or of a mesh comprised of fine knitted iron wires. Each projection 2a is cutout in the side wall downwardly from the upper end in several positions (there are two projections in this embodiment) so as to form oil passages 2b. Oil in the oil sump may be guided to openings 54d and 55d in valve casings 54a and 55a through the oil passages 2b. When operating oil flows in the closed fluid circuit at the negative pressure side thereof, ball 54b or 55b of check valve 54 or 55 is subjected to negative pressure causing the ball to rises and float, so that the clean oil stored in the oil filter 56 is supplied into openings 54d and 55d in the valve casing 54a or 55a through the oil passages 2b in projection 2a and into first linear oil passage 5a or second linear oil passage 5b at the negative pressure side through oil hole 5c or 5d.

Figure 23:
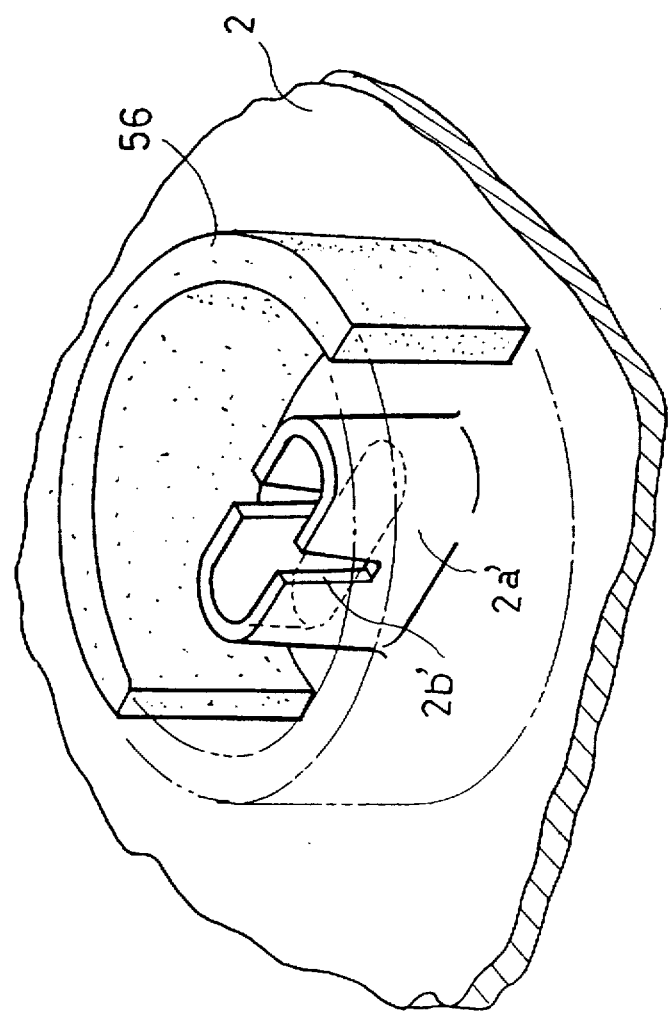
FIG. 23 is a perspective view of a modified embodiment of the same.

A modified embodiment of projection 2a may be formed as shown in FIG. 23. In other words, projection 2a' is formed as a single elongate cylindrical member of external shape striding across both valve casings 54a and 55a. The lower surfaces 54c and 55c of valve casings 54a and 55a abut against the upper end surface of the projection so as to provide an oil passage 2b' from the upper end edge to the side wall. Projections 2a and 2a' can be cast simultaneously when molding lower half housing 2. In this modified embodiment, the plate element for constituting the check valve required to be screwably fixed to the lower surface of center section 5 can be omitted, thereby the construction of the check valves may be simplified so as to reduce the number of parts and the manufacturing cost.

As shown in FIGS. 3, 5 and 9, a by-pass operating arm 60 is disposed on upper half housing 1 so as to open first and second linear oil passages 5a and 5b into the oil sump for enabling the axles to be idle when the vehicle is hauled. In particular, by-pass operating arm 60 is fixed at the base thereof to an upper end of a by-pass shaft 61 which is vertically and pivotally supported to the upper wall of upper half housing 1. By-pass shaft 61 extends at the lower end thereof into vertical portion 501 of center section 5 so as to form at the side surface a flat surface 61a. A through bore 5e (see FIG. 8) is open on motor mounting surface 41 of center section 5, slightly above the center thereof and between arcuate ports 41a and 41b. A push pin 62 is slidably supported into through bore 5e in the direction of the axis of rotation of cylinder block 17 and can abut at one end against the rear surface of cylinder block 17 in close contact with motor mounting surface 41 and at the other end against flat surface 61a of by-pass shaft 61.

In such a construction, when an operator operates by-pass operating arm 60 outside of the housing for hauling the vehicle, by-pass shaft 61 is rotated and flat surface 61a at the lower end thereof presses push pin 62 toward cylinder block 17 so that push pin 62 releases the close contact of motor mounting surface 41 with cylinder block 17. First and second linear oil passages 5a and 5b communicate with the oil sump in the housing through arcuate ports 41a and 41b, thereby enabling output shaft 4 and axles 7 to be idle.

Figure 21:
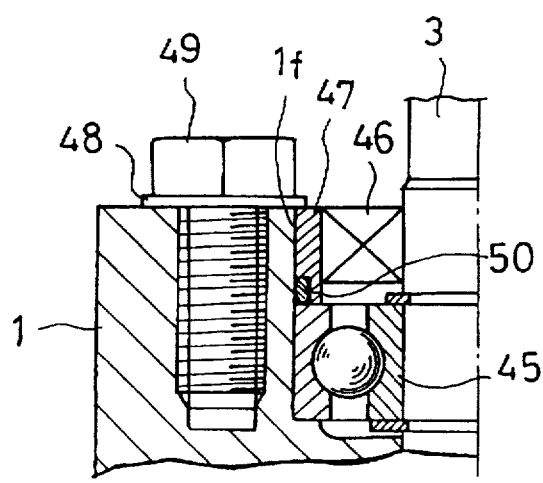
FIG. 21 is an enlarged cross-sectional view of the principal portion of a support for a pump shaft.

Pump shaft 3, as shown in FIG. 3, is rotatably supported at the lower end thereof by a central portion of mounting surface 40 and at the upper portion through a bearing 45 in a bearing support 1f formed in the upper wall of the housing. Conventionally, on the inner peripheral surface of bearing support 1f for fitting therein bearing 45, a retaining groove for fitting therein a locking ring for bearing 45 has been machined. Such machining, however, takes much time and labor causing a high manufacturing cost. In this embodiment, as shown in FIG. 21, when upper half housing 1 is molded, bearing 45 and sealing member 46 are fitted onto pump shaft 3 and are inserted into bearing support 1f directly after being cast and is not machined. The outer periphery of sealing member 46 is coated with a ring 47 of sintered material or synthetic resin, and a washer or a plate 48 fitted by mounting bolts 49 to the upper surface of bearing support 1f is brought into contact with the upper end surface of ring 47 so as to lock bearing 45 in place. In addition, an O-ring 50 is interposed between the outer periphery of ring 47 and the inner periphery of bearing support 1f to seal them for preventing oil from leaking therebetween.

Figure 19:
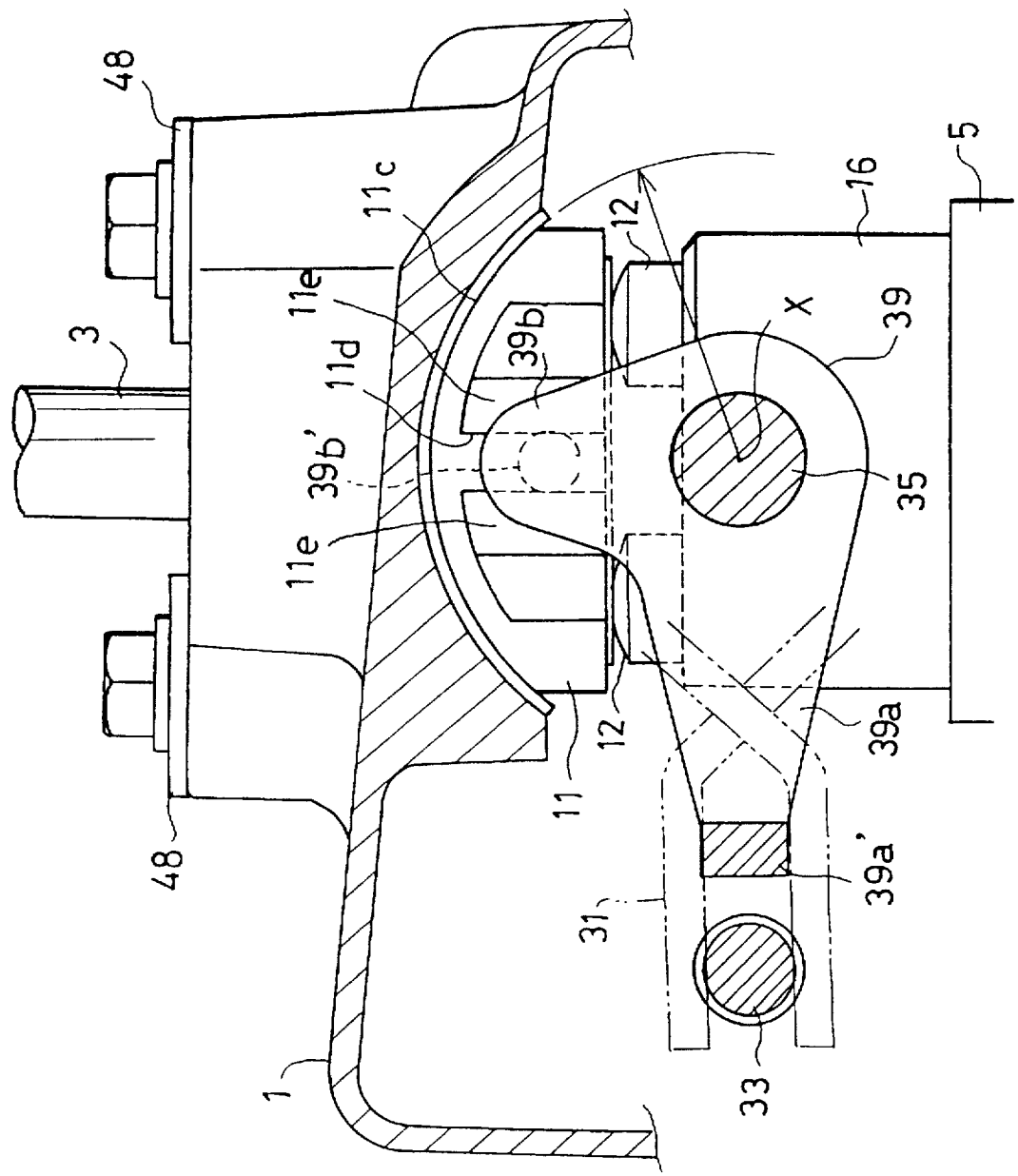
FIG. 19 is a cross-sectional side view showing an operating mechanism for a movable swash plate.

The piston abutting surface of movable swash plate 11 is slantingly operated with respect to the axis of rotation of cylinder block 16 to thereby change the amount and direction of oil discharged from the hydraulic pump. As shown in FIG. 19, at the rear surface of movable swash plate 11 is formed a convex portion 11c. At the inner surface of the upper wall of upper half housing 1 is formed a concave portion similar in shape to convex portion 11c. Movable swash plate 11 is cradled to slide along the concave portion of upper half housing 1 when it is slantingly moved. Movable swash plate 11 may be of a trunnion type having shafts at both lateral sides thereof. The axis of slanting movement of movable swash plate 11 is positioned on the center of curvature X of convex portion 11c and extends perpendicular to the extending direction of arcuate ports 40a and 40b open on pump mounting surface 40 of center section 5. Thus, the axis extends in parallel to output shaft 4 and axles 7.

Figure 20:
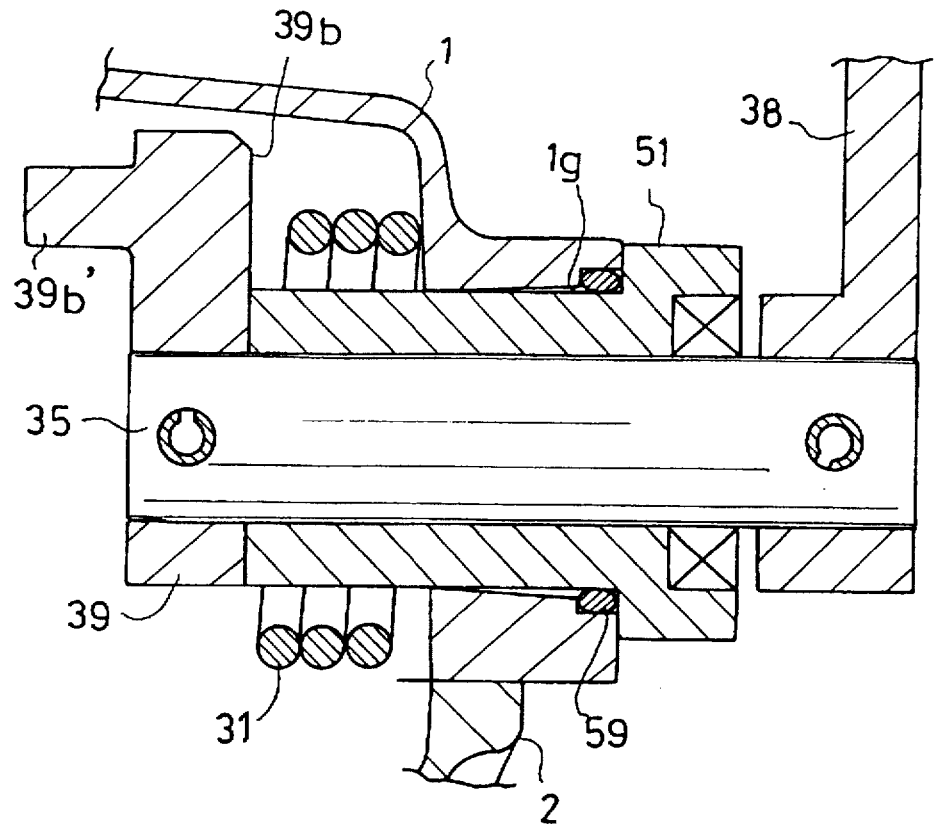
FIG. 20 is a partial cross-sectional front view of a part of the principal portion of the same.

Movable swash plate 11 is constructed for slanting movement. As shown in FIGS. 19 and 20, a control shaft 35 is disposed on the side wall of upper half housing 1 positioned on a phantom extension line of the center of curvature X of the inner peripheral surface of convex portion 11c and is rotatably supported on cylindrical bush 51. As shown in FIGS. 2 and 3, cylindrical bush 51 is press-fitted into an insertion bore 1g open in the side wall of upper half housing 1. The reason for this is that when insertion bore 1g is cast when upper half housing 1 is molded, a draft is formed, so that it is difficult to directly support control shaft 35 in insertion bore 1g while keeping the oil tight using cylindrical bush 51. In addition, an O-ring 59 is interposed for sealing between the outer peripheral surface of cylindrical bush 51 and the inner peripheral surface of insertion bore 1g. Cylindrical bush 51 is used to omit the need to machine insertion bore 1g, thereby decreasing the manufacturing cost of upper half housing 1.

Onto the outer end of the control shaft 35 outside of the housing is fixed a control arm 38 to enable movable swash plate 11 to be slantingly operated from the exterior of the housing. Control arm 38 is connected through a control rod (not shown) and may be pushed or pulled longitudinally to control the vehicle with respect to a speed changing member (not shown), such as a lever or a pedal (not shown) provided on the vehicle. A swinging arm 39 is fixed to the inner end of control shaft 35 within the housing, and comprises a first arm 39a an a second arm 39b which radially extend from shaft 35. From the utmost end of first arm 39a projects an engaging portion 39a' extending in parallel to control shaft 35. From the utmost end of second arm 39b projects an engaging portion 39b' extending in parallel to control shaft 35. Engaging portions 39a' and 39b' project opposite to each other. Engaging portion 39b' is directly connected to a groove 11d provided in the side surface of movable swash plate 11. Groove 11d is formed between a pair of engaging projections 11e disposed on the side surface of movable swash plate 11 and are longitudinally spaced at a predetermined interval.

In such construction, when control arm 38 is rotated longitudinally of the vehicle body, swinging arm 39 rotates longitudinally around control shaft 35 to enable movable swash plate 11 to be slantingly operated and the hydraulic pump to be operated to change its output. In addition, in this embodiment, second arm 39b is provided at the utmost end thereof with engaging portion of 39b', however, second arm 39b may enter at the utmost end thereof directly into groove 11d between engaging projections 11e. Since the arm of control shaft 35 coincides with the center of curvature X of convex portion 11c, engaging portion 11e and engaging portion 39b', no matter what slanting position moveable swash plate 11 is kept in, always abut against each other in one point. Whereby there is no need to provide any shaft guide member as allowing relative slide between engaging portion 39b' and groove 11d. Hence, it is easy to manage the dimension between engaging projections 11e and engaging portion 9b' and the neutral position of movable swash plate 11 can be easily obtained.

As shown in FIG. 20, a coiled neutral return spring 31 is fitted onto cylindrical bush 51. Both ends of return spring 31 are crossed to extend in the direction of first arm 39a and sandwich therebetween an eccentric shaft 33 mounted to the inside wall of upper half housing 1 near control shaft 35 and engaging portion 39a' of swinging arm 39. Accordingly, when control arm 38 is turned for changing the vehicle speed, swinging arm 39 is turned and the one end of neutral return spring 31 is moved away from the other end, which is received by eccentric shaft 33, thereby applying to control arm 38 a biasing force to return to the neutral position. When the operating force to the speed changing member is released, a restoring force generated at one end of neutral return spring 31 returns engaging portion 39a' toward eccentric shaft 33 so as to hold control arm 38 in the neutral position. The extension of eccentric shaft 33 outside of the housing creates an adjusting screw so as to enable eccentric shaft 33 to be rotatably shifted, whereby swinging arm 39 can be shifted to an optional position around control shaft 35 so that movable swash plate 11 is adjustable to be in the accurate neutral position.

As mentioned above, the present invention is designed so that the arcuate ports on the pump mounting surface formed on the horizontal portion of the center section are open perpendicular to the direction in which the oil passages extend. Each end of the arcuate ports overlap with an oil passage. One end of one arcuate port is made deep to communicate with one of the oil passages. One end of the other arcuate port is made deep to communicate with the other oil passage. Whereby, the arcuate ports can simply communicate with each other and the center section can be inexpensively produced. The arcuate ports open on the pump mounting surface are oriented in the direction of forward movement. The axis of slanting movement of the movable swash plate is made to extend laterally of the vehicle body, whereby the control shaft for slantingly moving the movable swash plate can be disposed perpendicular to the axis of rotation of the hydraulic pump and in parallel to the axles. Hence, the rotating direction of the arm provided on the control shaft and the operating direction of the control rod connected with the speed changing member are coincident with each other so as to enable the link mechanism for connecting the speed changing member and the control arm for the movable swash plate to be simplified.

Since the axis of the control shaft for rotating the movable swash plate coincides with the center of curvature of the concave portion of the cradle type movable swash plate, the engaging portion at the swinging arm provided on the control shaft with respect to the groove at the side surface of the movable swash plate can simply be constructed, thereby enabling the shaft guide member to be omitted and the number of parts to be reduced. Also, the engaging portion of the swinging arm scarcely has relative slide with respect to the groove in the movable swash plate, whereby the movable swash plate can smoothly slantingly be operated without applying an excessive force, resulting in an improvement in operability.

Also, oil holes are branched from a pair of oil passages in the center section for fluidly coupling the hydraulic pump and hydraulic motor are open at the lower surface of the center section. The check valves comprising the valve casing and the balls therein and for supplying the operating oil are inserted into the oil holes. The valve casings are supported at the lower surface by projections provided on the inner bottom surface of the housing, whereby the check valves can be extremely simply constructed so as to lower the manufacturing cost. The projections are simple in shape and can be formed simultaneously when the housing is manufactured.

Figure 24:
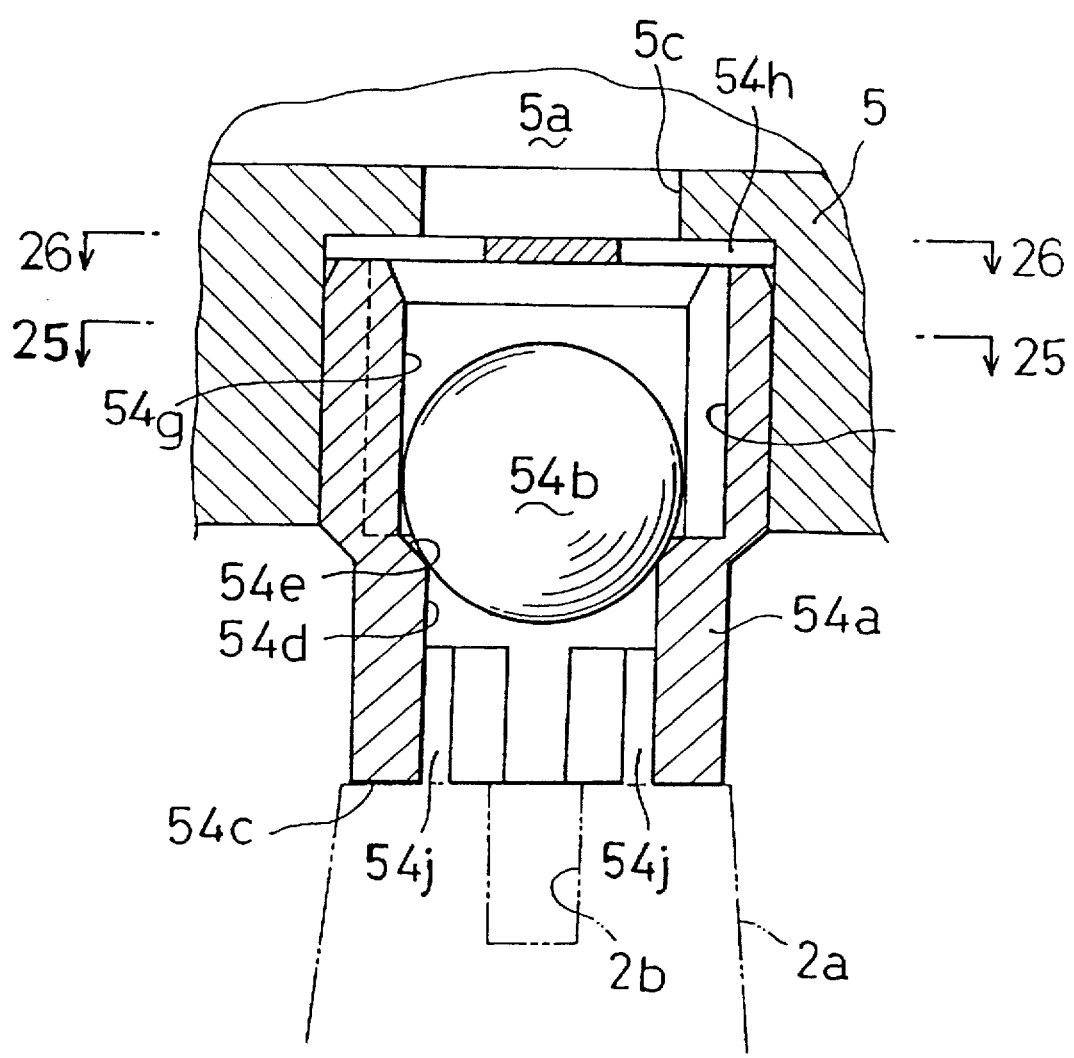
FIG. 24 is a cross-sectional view of a modified valve of the present invention.
Figure 25:
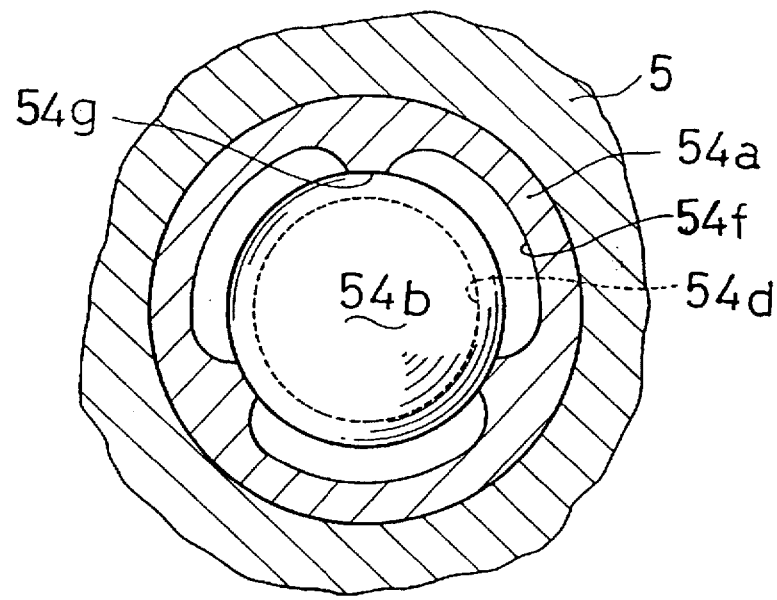
FIG. 25 is a cross-sectional view looking in the direction of arrows 25—25 in FIG. 24.
Figure 26:
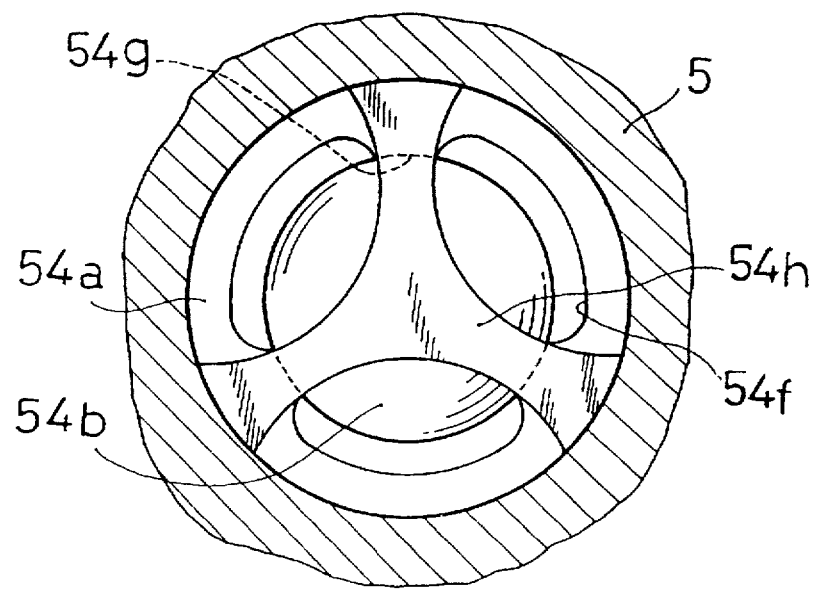
FIG. 26 is a cross-sectional view looking in the direction of arrows 26—26 in FIG. 24.

An alternative embodiment of the check valve of the present invention is shown in FIGS. 24, 25 and 26, in which similar reference numerals have been used to refer to similar elements described above. In this embodiment, a hole 54f in valve 54, which is a continuation of opening 54b, has a diameter which is larger than that of ball 54b. On the inner surface of hole 54f is formed three projections 54g (See FIG. 25) which contact with the outer diameter of ball 54b. Projections 54g extend in the direction of the longitudinal axis of valve casing 54a and are spaced equally apart from each other inner circle. When oil hole 5c is subject to negative pressure, ball 54b separates from valve seat 54e causing oil to flow from the lower portion to the upper portion of valve 54. Projections 54g maintain ball 54b in a straight path preventing it from shaking within valve casing 54a as it rises above valve seat 54e.

A stopper plate 54h is provided at the top of valve casing 54a to prevent ball 54b from flowing out of valve casing 54a when the valve is released to permit oil to flow through valve 54. The outer diameter of stopper plate 54h has three indentations which permit the oil to circulate smoothly through stopper plate 54h. A second opening 54j is formed at the lower end of valve casing 54a to increase the suction area of opening 54d.

Figure 27:
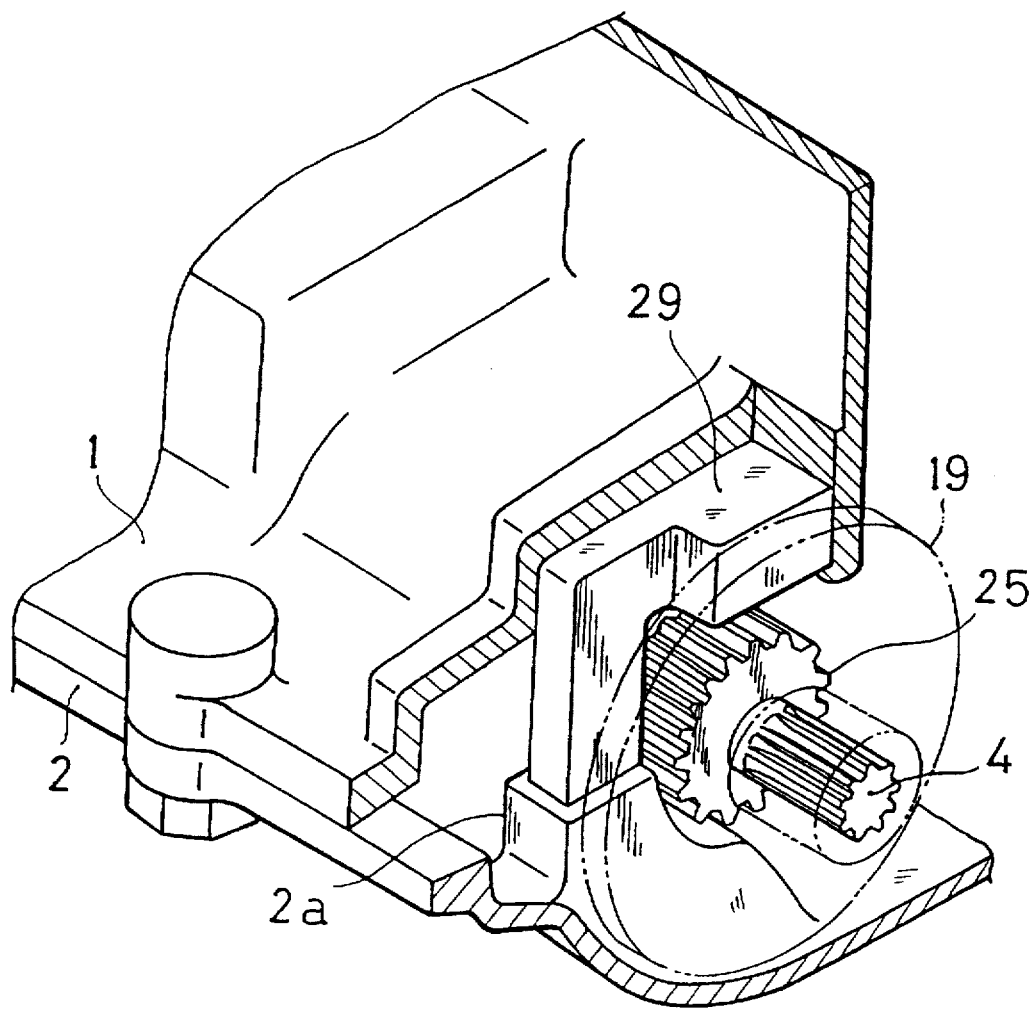
FIG. 27 is a partial sectional view of a modified embodiment of the brake pad of the present invention.

An alternative embodiment of the brake pad of the present invention is shown in FIG. 27, in which similar reference numerals have been used to refer to similar elements described above. In this embodiment, brake pad 29 is formed in an upside-down L-like shape when viewed in plan and is provided in a similar shaped cavity formed in upper half housing 1. The upper, horizontal portion of brake pad 29 contacts the top, rear and side walls of the cavity. The end of the lower, vertical portion of brake pad 29 is coextensive with the joint surface of upper housing 1 and lower housing 2 and is in contact with a projection 2a formed on the inner surface of lower housing 2. During assembly, brake pad 29 is inserted into the cavity formed in upper housing 1 before upper housing 1 and lower housing 2 are joined. As a result, brake pad 29 is non-rotatably fixed in the cavity.

Figure 28:
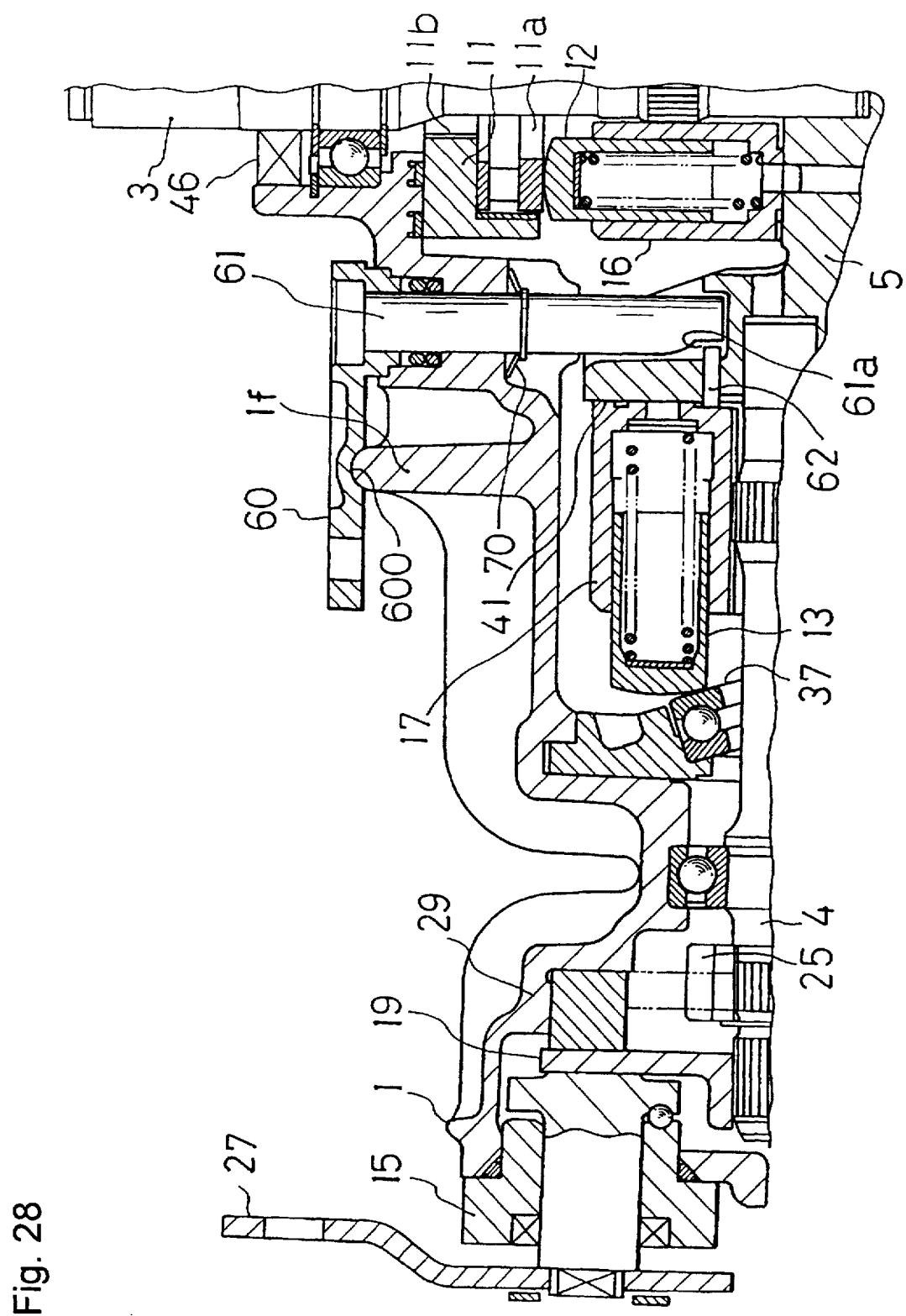
FIG. 28 is a cross-sectional view of a modified embodiment of the by-pass mechanism of the present invention.
Figure 29:
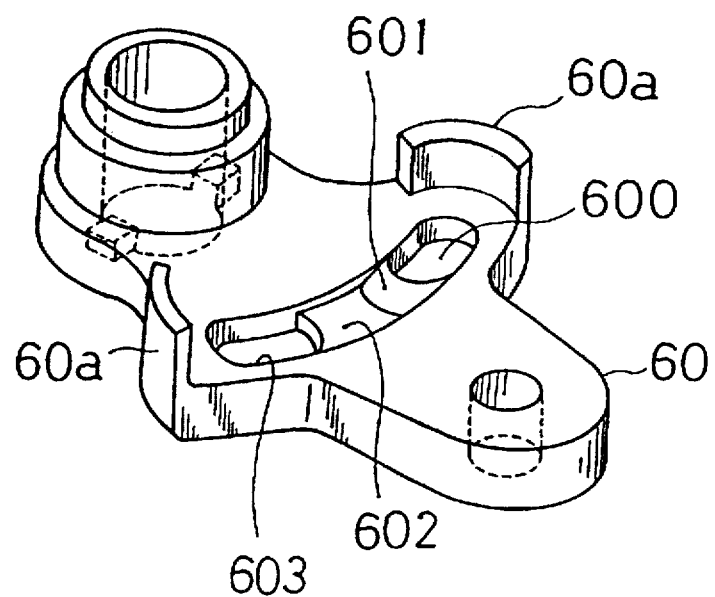
FIG. 29 is a detailed view of the by-pass operating arm of FIG. 28.
Figure 30:
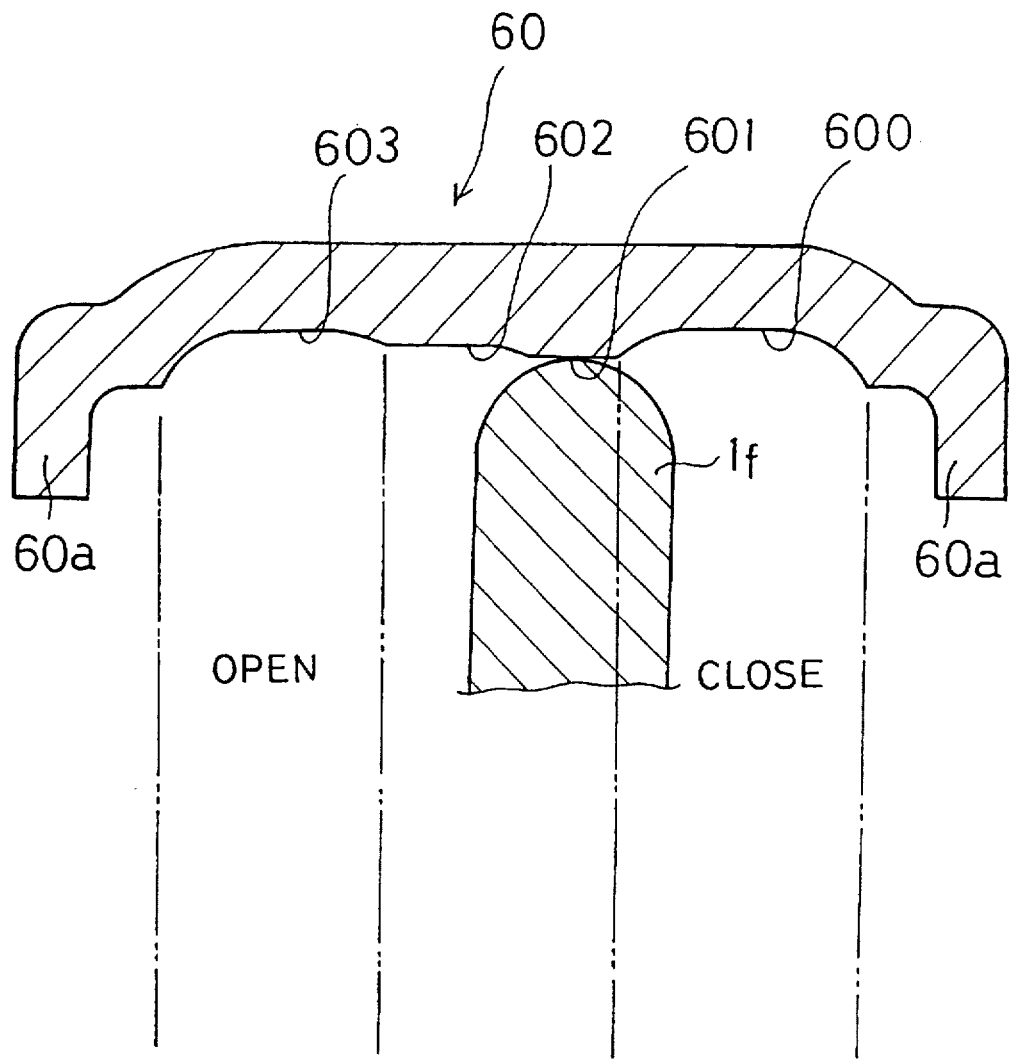
FIG. 30 is a further detailed view of the same.

An alternative embodiment of the by-pass operating arm of the present invention is shown in FIGS. 28, 29 and 30 in which similar reference numerals have been used to refer to similar elements described above. As described above, when by-pass shaft 61 is rotated about 35°, motor cylinder block 17 rises from motor mounting surface 41 of center section 5. Notches 600, 601, 602 and 603 are formed in the bottom surface of by-pass arm 60. Notches 600, 601, 602 and 603 are each of varying depth and are connected to form a continuous circular arc in by-pass arm 60. A unitary projection 1f extends upwardly from upper housing 1. The top end of projection 1f fits into notches 600, 601, 602 and 603. Notches 600 and 603 are disposed at the ends of the circular arc and are of equal depth. Notch 601 is disposed adjacent to and is shallower than notch 600. Notch 602 is disposed between notch 601 and notch 603. Notch 602 is deeper then notch 601, but is shallower than notch 603.

When projection 1f is fitted in notch 600, cylinder block 17 is held in a "closed position" in close contact with motor mounting surface 41. Because by-pass arm 60 is made of synthetic resin material, it bends which permits arm 60 to be shifted between notches 600, 601, 602 and 603. While by-pass arm 60 is turning 35°, projection 1f is shifted from notch 600 to shallower notch 601 which puts resistance on the arm giving the operator the feeling that arm 60 is heavy. When Projection 1f is then shifted to notch 603 through notch 602, cylinder block 17 is moved to the "open position" and rises from motor mounting surface 41. A projection 60a is formed at each end of arm 60 and contacts the side surface of projection 1f to prevent it from being shifted beyond notch 600 or notch 603. A plate spring 70 is provided between an inner upper surface of upper housing 1 and by-pass shaft 61. Plate spring 70 biases by-pass arm 60 and by-pass shaft 61 downwardly to eliminate play and to maintain projection 1f in one of notches 600, 601, 602 and 603.

While preferred embodiments of the present invention have been described using specific terms, such description is for illustrative purpose only, and it is to be understood that changes and variations may be made without departing from the spirit or scope of the invention as defined in the following claims.

What is claimed is:

1. An axle driving apparatus comprising:

a housing;

an axle disposed in said housing;

an oil sump formed in said housing;

a substantially L-like shaped center section having a horizontal portion and a vertical portion disposed in said housing;

a hydraulic pump disposed on said horizontal portion of said center section;

a hydraulic motor disposed on said vertical portion of said center section for driving said axle;

a pair of oil passages provided in said center section;

a first pair of arcuate ports formed on said vertical portion of said center section and communicating with said pair of oil passages; and a second pair of arcuate ports formed on said horizontal portion of said center section, wherein each of said second pair of ports has a length and a depth, wherein said length and depth are substantially perpendicular to each other, and wherein said length of each of said second pair of ports is disposed substantially perpendicular to a direction in which said oil passages extend;

wherein one end of one of said second pair of arcuate ports is made deep to communicate with one of said pair of oil passages and one end of the other of said second pair of arcuate ports is made deep to communicate with the other of said pair of oil passages.

2. An axle driving apparatus as set forth in claim 1, wherein an end portion of each of said second pair of arcuate ports is overlapped with each of said pair of oil passages.

3. An axle driving apparatus as set forth in claim 1, wherein said hydraulic pump is a variable displacement axial piston type, in which a cylinder block housing therein a plurality of pistons which are movable in reciprocation is rotatably disposed on said horizontal portion of said center section and heads of said pistons abut against a movable swash plate, whereby said movable swash plate is slanted to change the amount and direction of oil discharged from said hydraulic pump and a control shaft for slantingly operating said movable swash plate is disposed substantially in parallel to said axle.

4. An axle driving apparatus as set forth in claim 3, wherein said control shaft is rotatably supported by a side wall of said housing and the axis of said control shaft is coincident with an axis of slanting rotation of said movable swash plate.

5. An axle driving apparatus as set forth in claim 4, wherein an upper surface of said movable swash plate is convex and a side surface of said movable swash plate has a groove, said housing is provided with a concave inner surface for receiving the upper convex surface of said movable swash plate, and said control shaft is provided with an engaging portion engageable with said groove on said movable swash plate.

6. An axle driving apparatus comprising;

a housing;

an oil sump formed in said housing;

axles disposed in said housing;

a center section disposed in said housing;

a hydraulic pump mounted on said center section;

a hydraulic motor mounted on said center section;

a pair of oil passages for fluidly connecting said hydraulic pump and said hydraulic motor provided in said center section;

oil holes branched from said pair of oil passages formed in said center section;

a valve casings inserted into each of said oil holes;

a valve body inserted into each of said valve casings;

openings provided in said valve casings which are closed by said valve bodies and are freely opened and closed so as to constitute a check valve; and projections formed on an inner surface of said housing which abut against end surfaces of said valve casings.

7. An axle driving apparatus as set forth in claim 6, wherein said openings of said valve casings are provided at the lower surface of each of said valve casings.

8. An axle driving apparatus as set forth in claim 6, wherein on the utmost end of each of said projections is provided an oil passage communicating with the outer peripheral surface of each of said projections, whereby said openings in said valve casings fluidly communicate with said oil sump.

* * * * *